Figure 1:
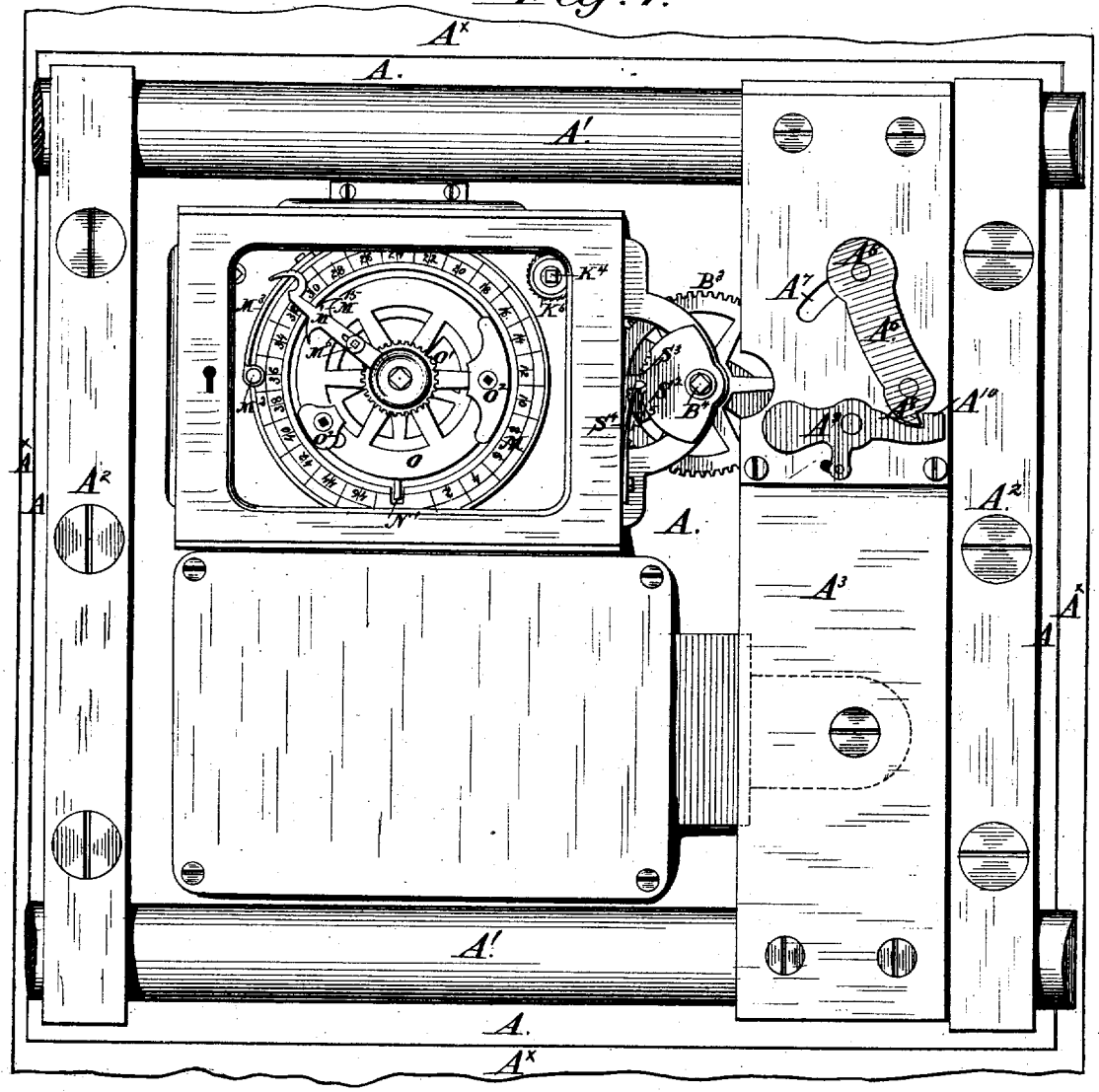

M. A. DALTON.
Time-Lock.

No. 221,789. Patented Nov. 18, 1879.

14 Sheets—Sheet 1.

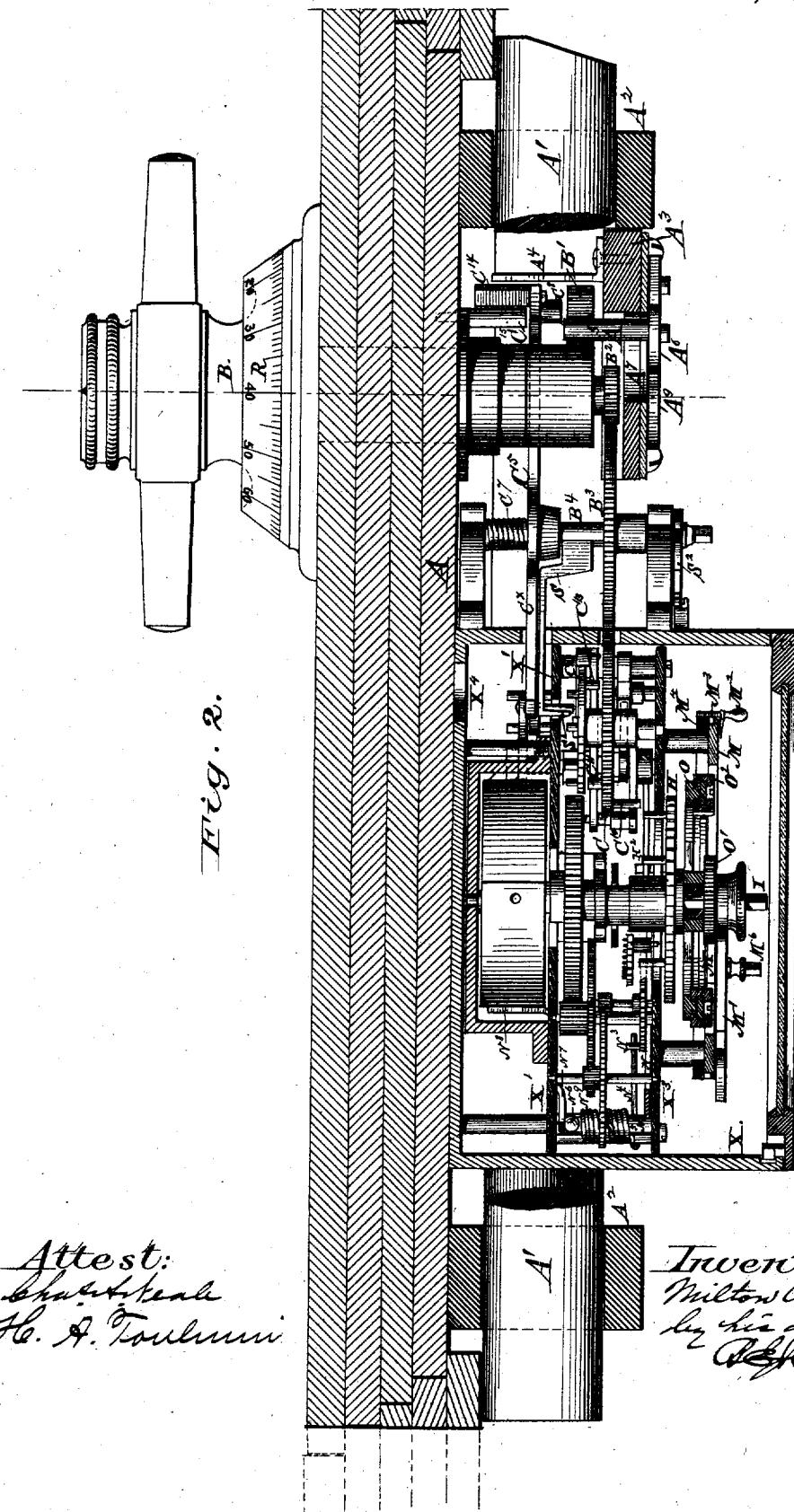

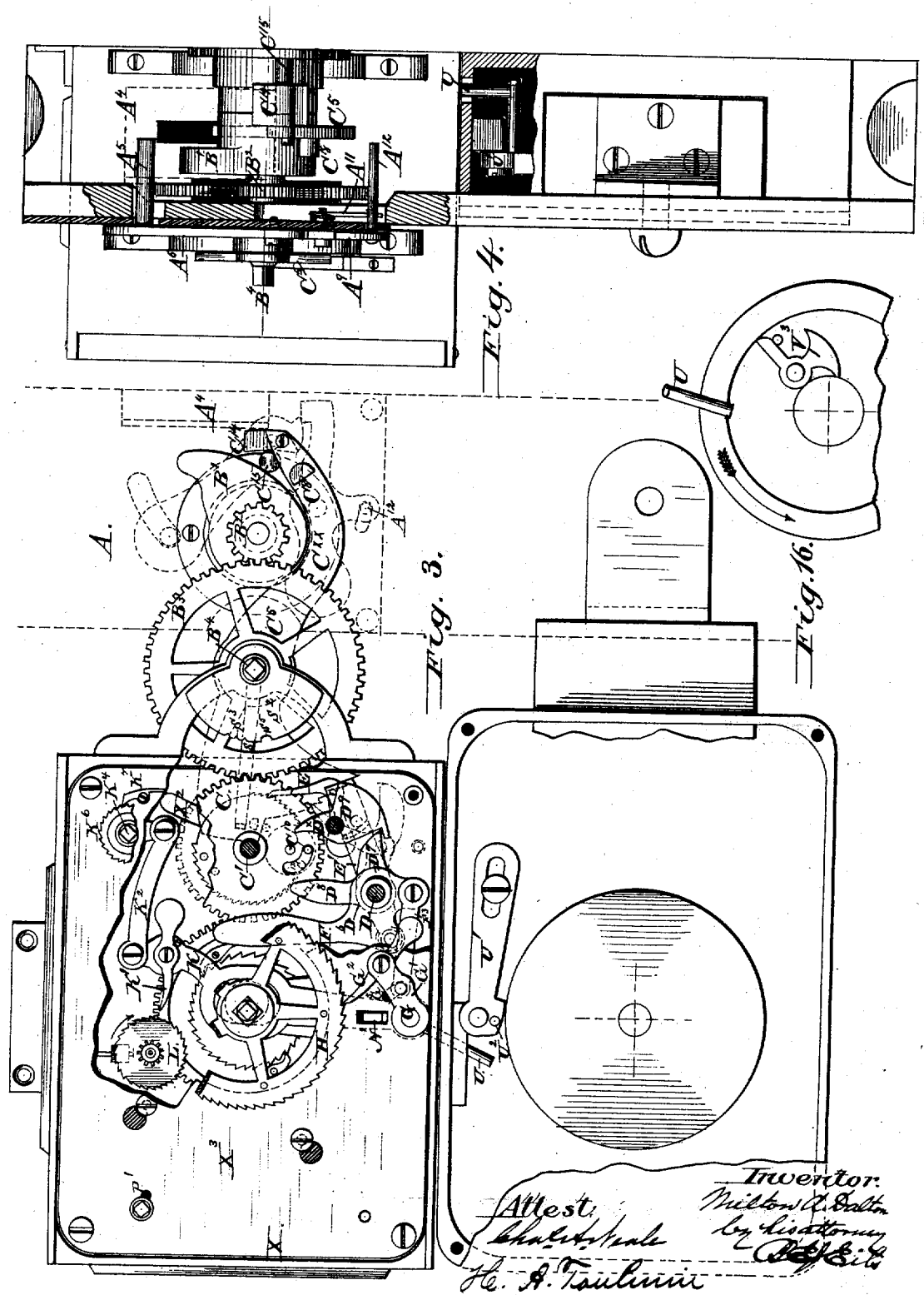

M. A. DALTON.
Time-Lock.

No. 221,789. Patented Nov. 18, 1879.

Attest:
Charles Neale
H. A. Toulmin.

Inventor.
Milton A. Dalton
by his attorney

M. A. DALTON.
Time-Lock.

No. 221,789.

14 Sheets—Sheet 5.

Patented Nov. 18, 1879.

Attest:
Chas. H. Neale
H. A. Toulmin

Inventor:
Milton A. Dalton
by his attorney

M. A. DALTON.
Time-Lock.

No. 221,789. Patented Nov. 18, 1879.

14 Sheets—Sheet 6.

Attest:
Charles Seale
H. A. Toulmin.

Inventor.
Milton A. Dalton
by his attorney

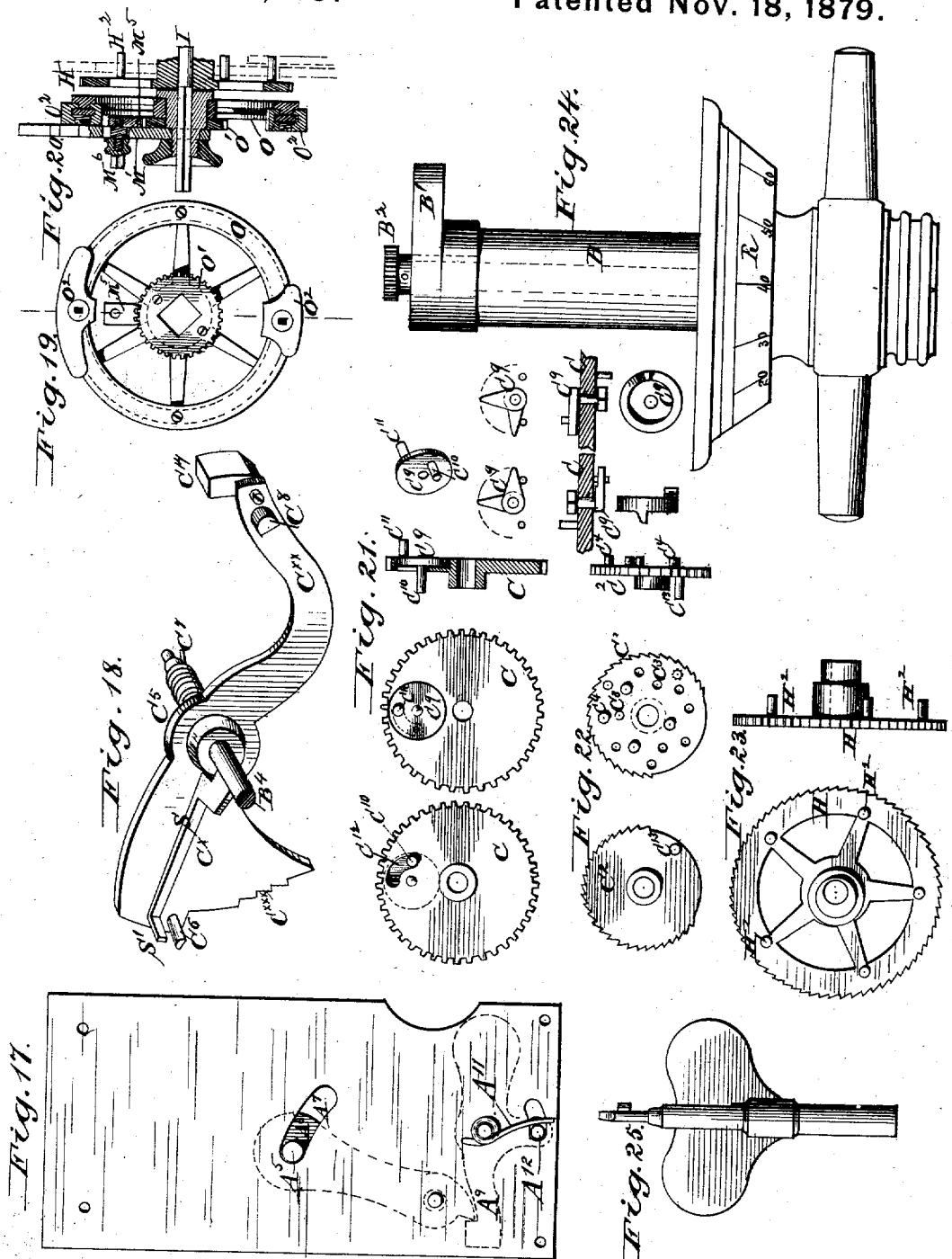

M. A. DALTON.
Time-Lock.
No. 221,789. Patented Nov. 18, 1879.
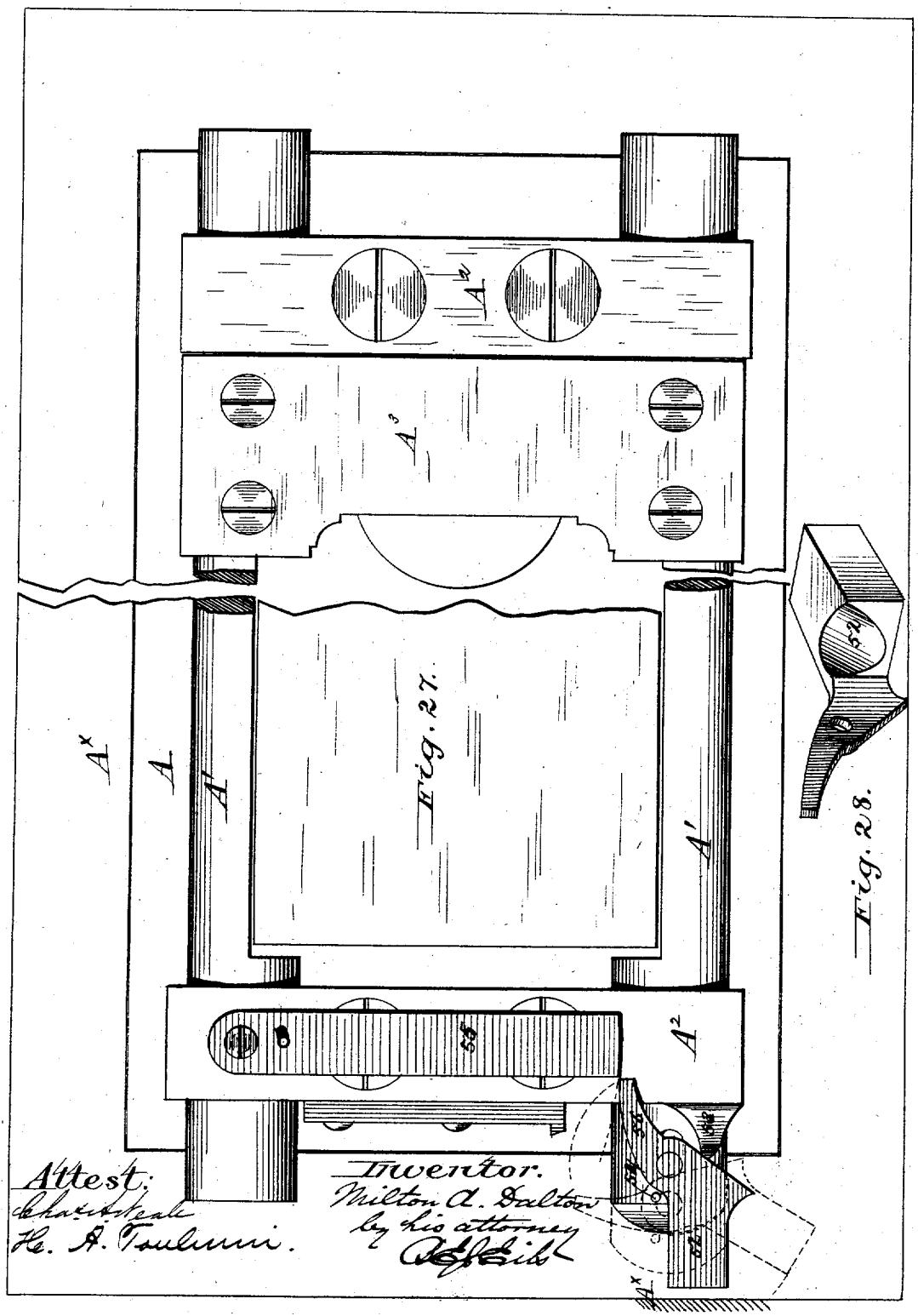

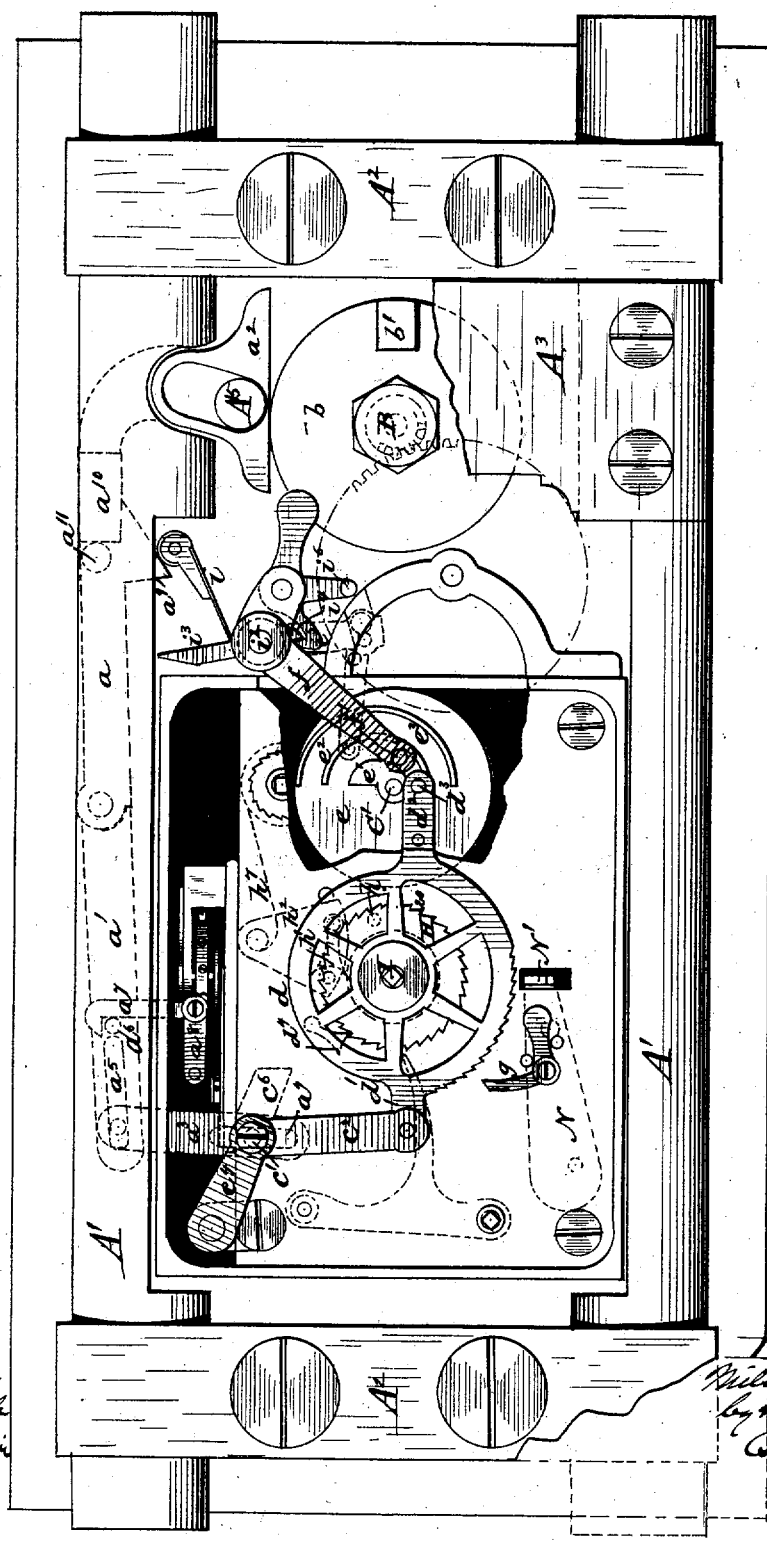

M. A. DALTON.
Time-Lock.
No. 221,789.   Patented Nov. 18, 1879.
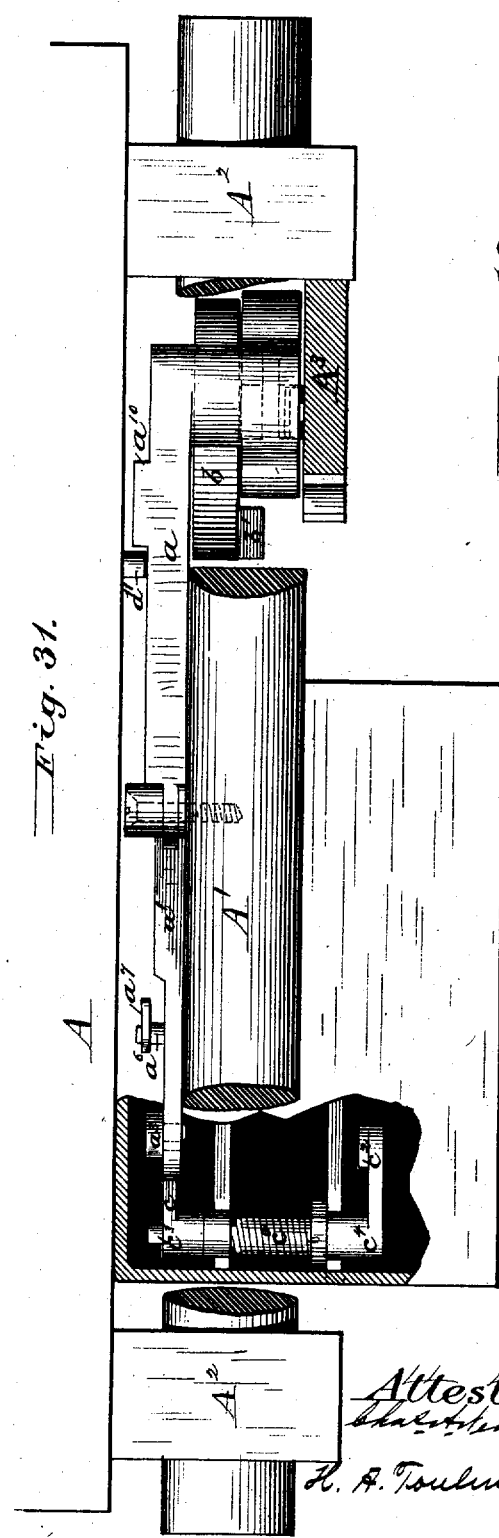
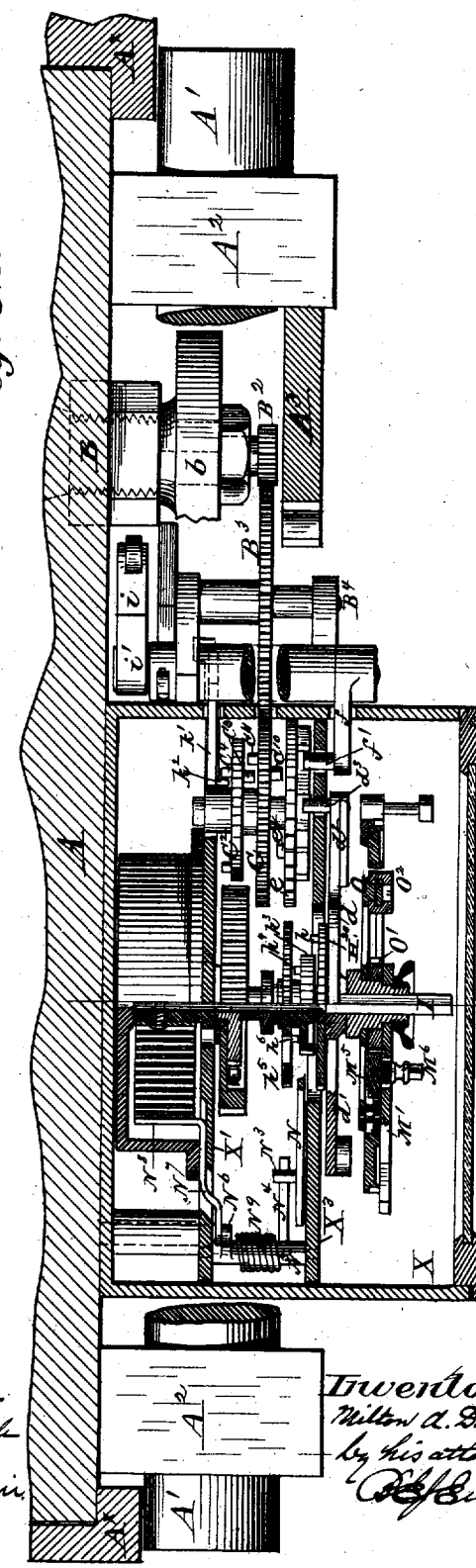

M. A. DALTON.
Time-Lock.
No. 221,789. Patented Nov. 18, 1879.
14 Sheets—Sheet 11.
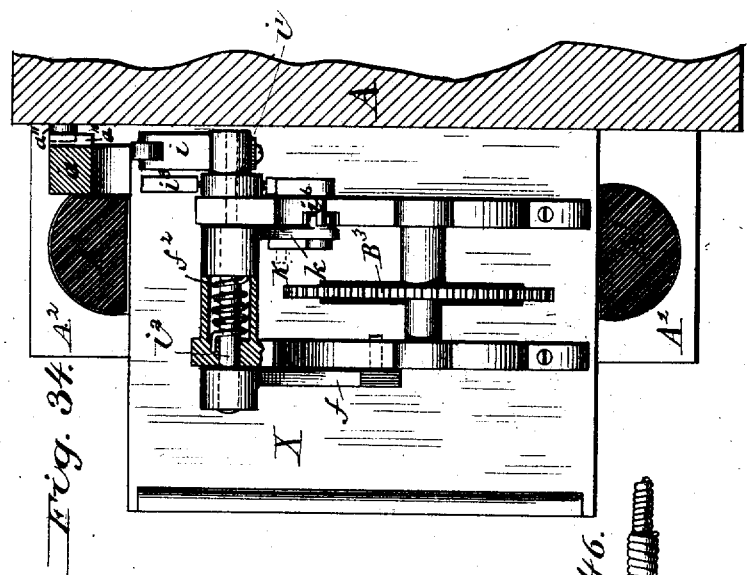
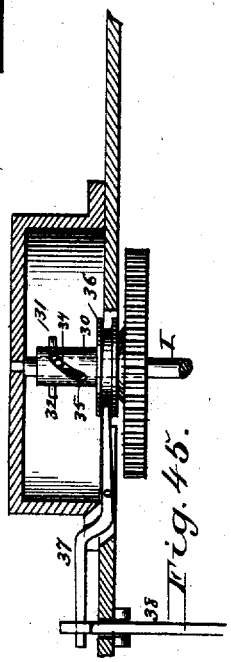
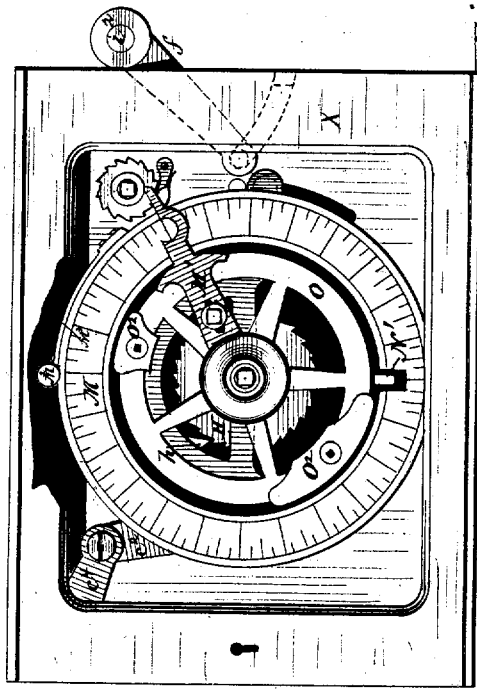
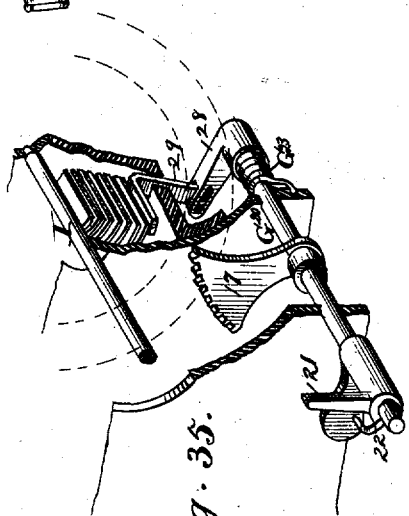

M. A. DALTON.
Time-Lock.
No. 221,789. Patented Nov. 18, 1879.
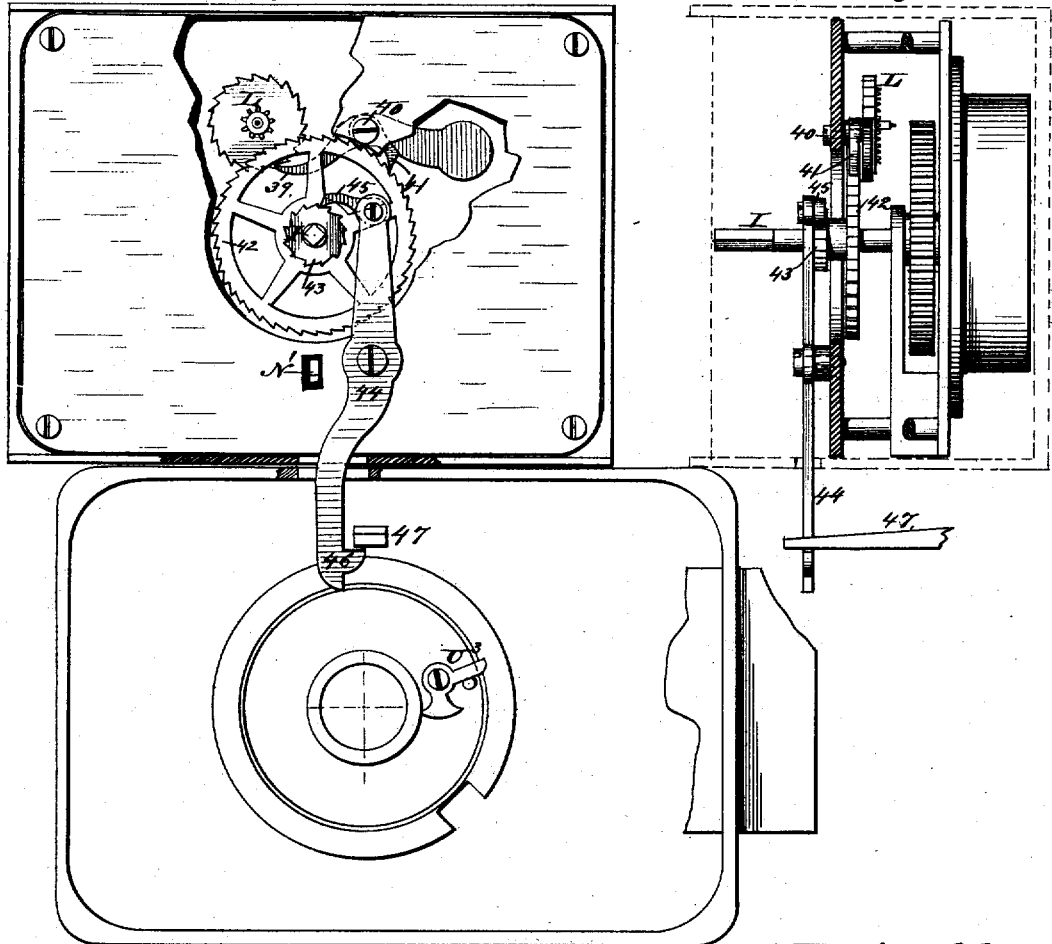
Fig. 36.
Fig. 37.
Fig. 38.
Fig. 39.
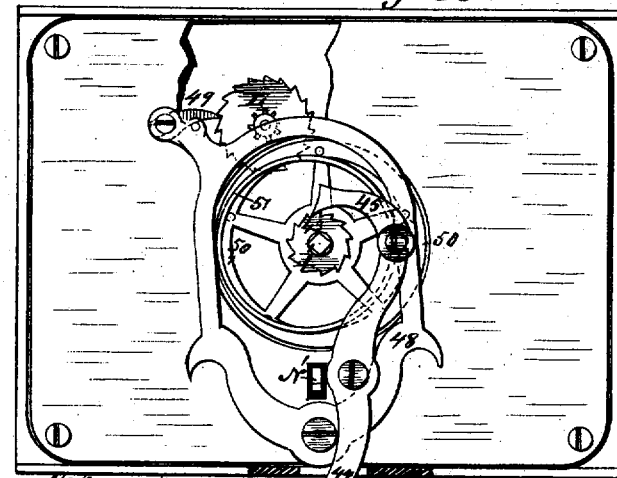
Attest:
H. A. Toulmin
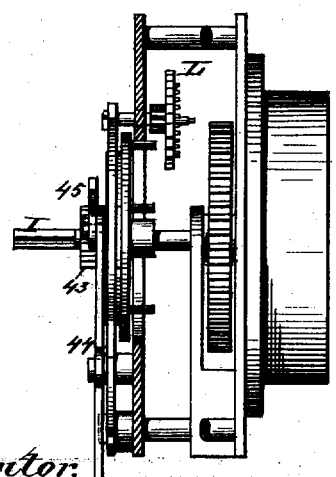
Inventor:
Milton A. Dalton
by his attorney M. A. DALTON.
Time-Lock.
No. 221,789. Patented Nov. 18, 1879.
14 Sheets—Sheet 13.
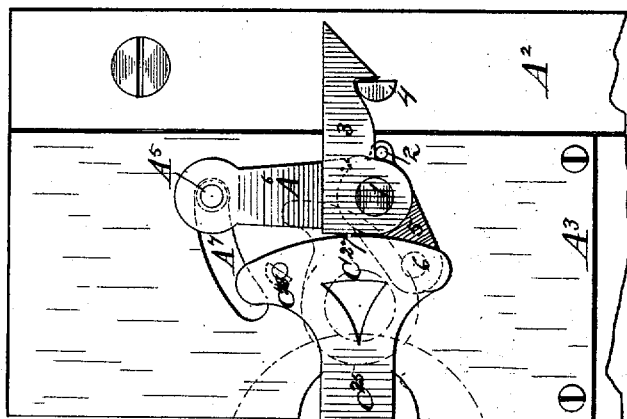
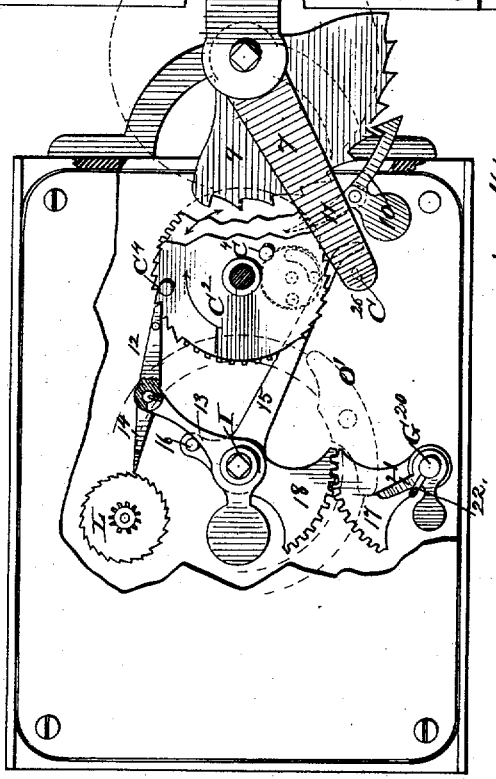
Fig. 40.
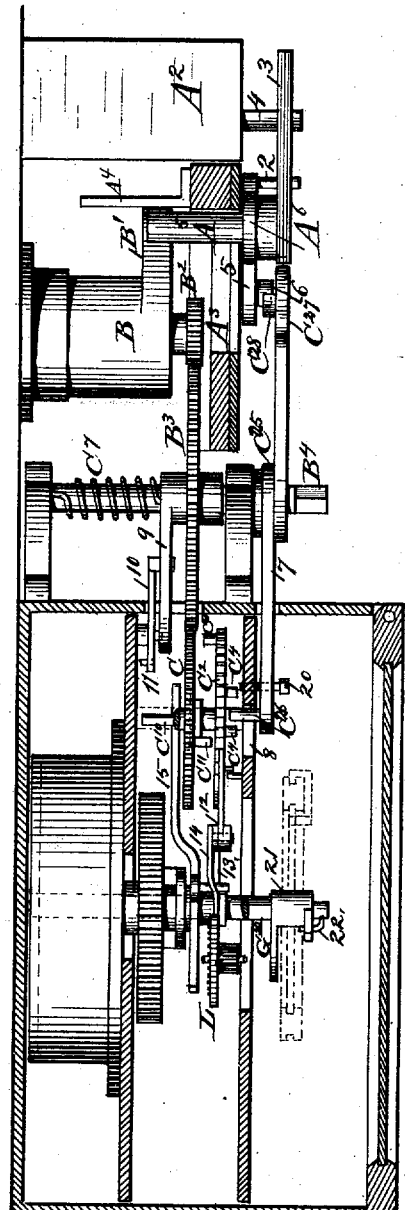
Fig. 41.
Attest:
Inventor.
Milton A. Dalton
by his attorney M. A. DALTON.
Time-Lock.

No. 221,789. Patented Nov. 18, 1879.

Attest:
Chas H Neale
H. A. Toulmin

Inventor.
Milton A. Dalton
by his attorney

UNITED STATES PATENT OFFICE.

MILTON A. DALTON, OF CINCINNATI, OHIO.

IMPROVEMENT IN TIME-LOCKS.

Specification forming part of Letters Patent No. 221,789, dated November 18, 1879; application filed January 21, 1879.

*To all whom it may concern:*

Be it known that I, MILTON A. DALTON, of Cincinnati, in the county of Hamilton and State of Ohio, have invented certain new and useful Dual Time-Locks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention consists of what I shall term a "dual time-lock," which may be defined as a unitary piece of mechanism embodying the principles of a time attachment for locks and the principles of a non-time or combination lock. In other words, while my newly-invented dual time-lock is adapted to perform the functions of an ordinary time attachment for locks, and also the functions of an ordinary combination or non-time lock, yet it is not a mere serial time-lock composed of a separate and distinct time attachment and a separate and distinct combination or non-time lock connected therewith, but is, on the contrary, a single indivisible structure of a dualistic functional character.

That my claim for the originality and novelty of a dual time-lock such as above defined is well founded may be established by a brief exposition of so much of the state of the art anterior to the date of my invention as has a direct bearing on this question. The only locking mechanisms known prior to my invention that require to be considered with reference to this question are those where a time attachment is used in connection with a non-time or combination lock in such a way that the time attachment determines at what time or times the non-time or combination lock may be unlocked by the person in possession of the unlocking instrumentality or formula, and at what other times it shall be out of the power of any person whomsoever to unlock the non-time or combination lock. Every pre-existing locking mechanism of this character is correctly designated by the term "serial time-lock," above used, for every one, without exception, consists of at least one time attachment and at least one non-time or combination lock arranged in series, with some part of the time attachment reaching to, for controlling at the proper time, some operative part of the non-time or combination lock. That these serial time-locks are not indivisible structural unities is conclusively proved by the fact that the non-time or combination lock may be detached from the time attachment, and that when so detached the non-time or combination lock is a complete structure within itself, capable of performing its individual functions. Hence, while the serial time-lock is capable of performing twofold functions, still it is not of a dualistic functional character, because it lacks the indivisible unitary structural character, and must therefore, of necessity, be different in principle from my dual time-lock.

In the illustration of my invention I have shown various forms, all embodying the same general principle of structural unity and functional duality.

In order to prevent the possibility of a lock-out by my dual time-lock, I have also embodied in its construction the leading feature of the inventions described in my several United States Letters Patent, respectively numbered 194,656, 194,896, and 199,520, namely, the feature which provides for the immediate unlocking of the dual time-lock in case its time-piece is stopped by internal accident before the appointed hour, unlocking under such circumstance being effected in the same manner and by the same means as when the time-piece is automatically stopped at the appointed hour. And the dual time-lock further embodies that feature of the invention described in my United States Letters Patent No. 199,520, in consequence of which the time mechanism may automatically alternately suspend and renew its guarding action.

The first eight sheets of the annexed drawings illustrate that form of my invention which is shown in the lock filed in the United States Patent Office as a model accompanying the application for this patent. The remaining sheets show various other forms of my invention.

In order to avoid confusion, I will first describe only what is shown in the first eight sheets of drawings, and after that successively explain the other forms of my invention, as illustrated in the remaining sheets of drawings.

Figure 7:
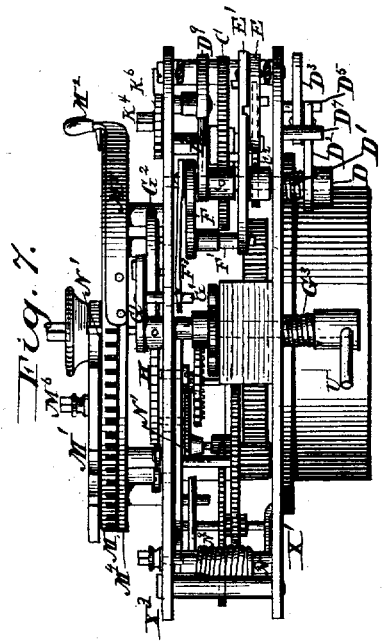
Figure 8:
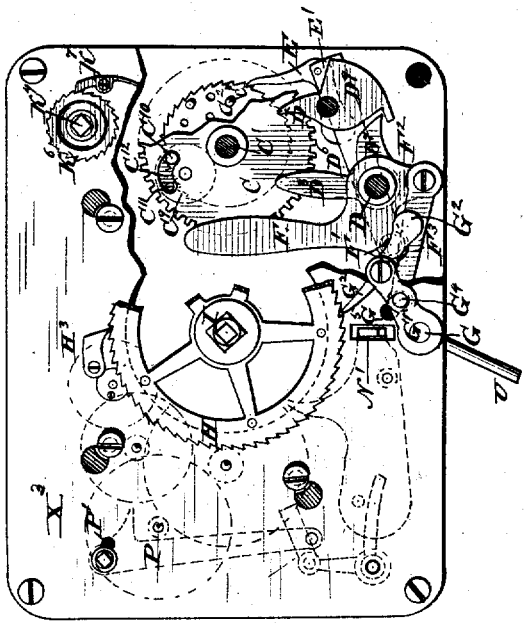
Figure 5:
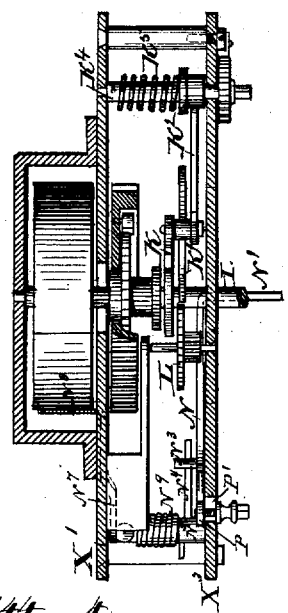
Figure 6:
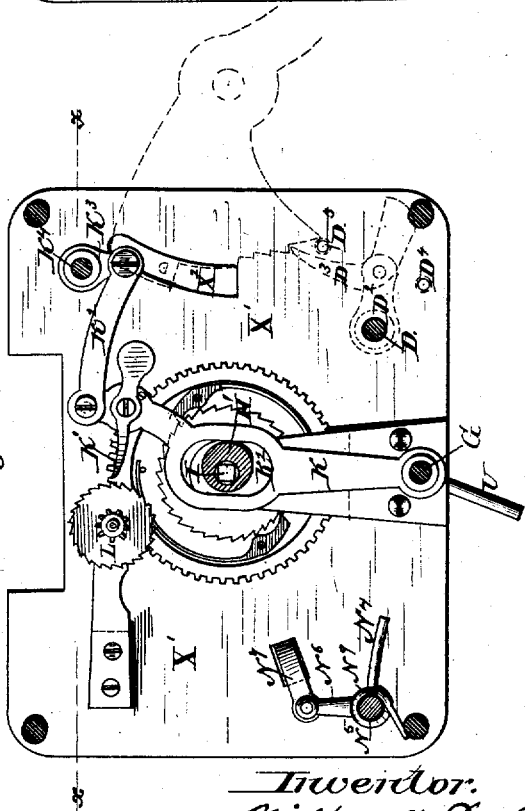
Figure 11:
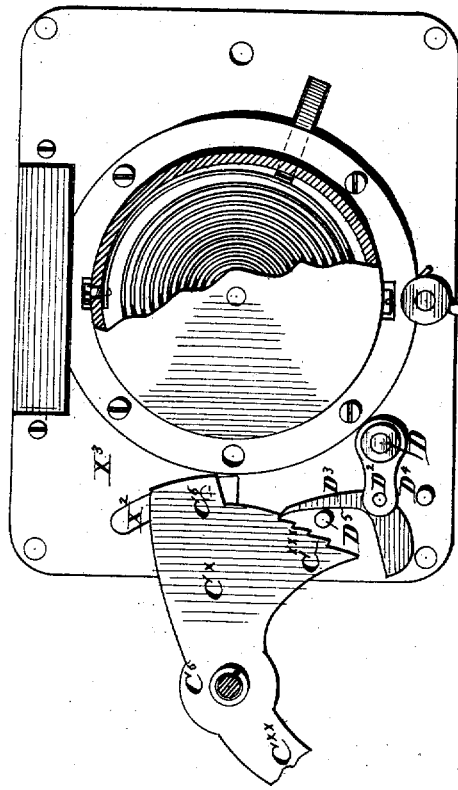
Figure 12:
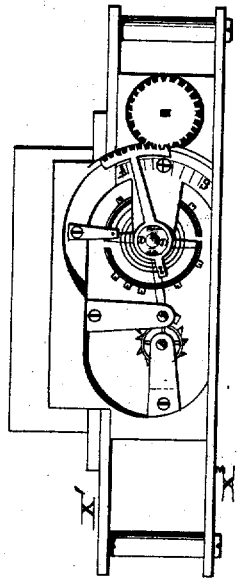
Figure 9:
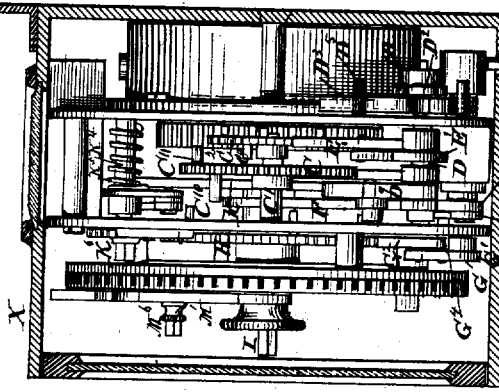
Figure 10:
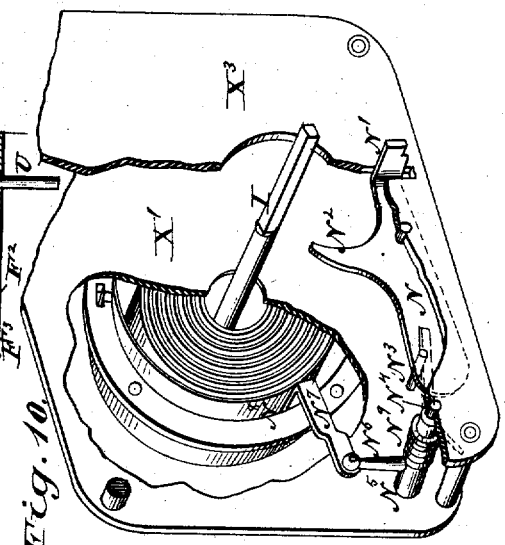
Figure 15:
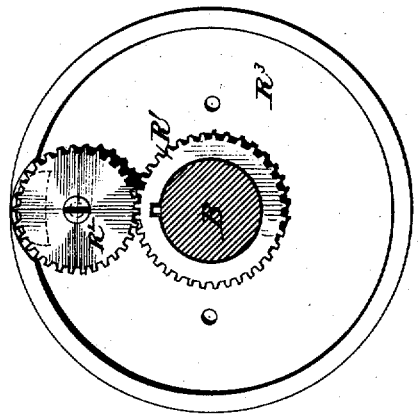
Figures 14, 26:
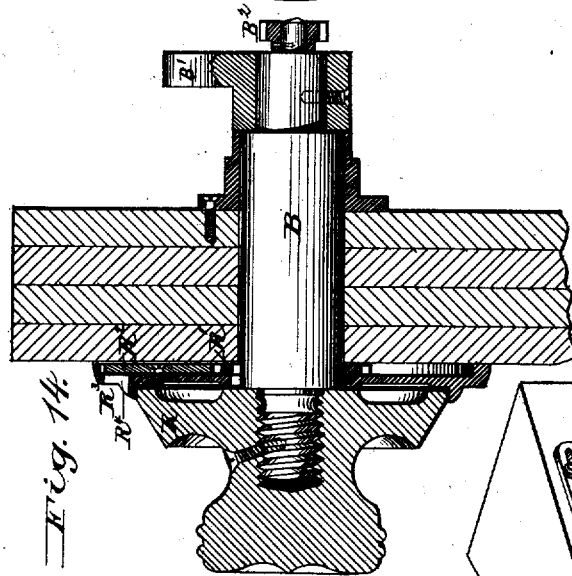
Figure 13:
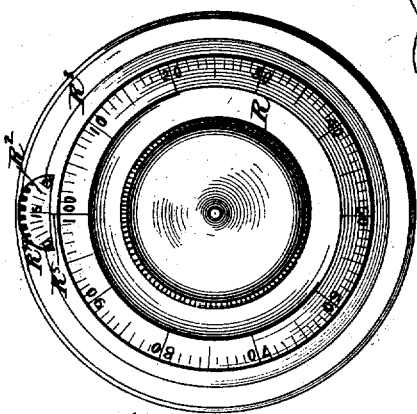

Figure 1 is an elevation of the interior of a safe or other secure receptacle, showing the door fastened by the bolt-work, with my dual time-lock on the door, as well as a separate non-time or combination lock. Fig. 2 is a sectional plan view of the same, where the separate non-time or combination lock is not shown, however. Fig. 3 is a front elevation of the same, with certain parts omitted and broken away in order to expose other parts to better advantage. Fig. 4 is a sectional end view of the same. Fig. 5 is a sectional plan view in the plane of line $x$ $x$ of Fig. 6. Fig. 6 is a front elevation of certain parts of the dual time-lock. Fig. 7 is a bottom view of parts thereof. Fig. 8 is a front elevation of parts thereof. Fig. 9 is a sectional end elevation of the lock. Fig. 10 illustrates the mechanism for locking the time-movement in case of accidental breakage of the mainspring. Fig. 11 is a rear elevation of the lock. Figs. 12 to 28 are detail views, which will be more specifically referred to hereinafter.

The same letters of reference are used in all these figures in the designation of identical parts.

I will first describe the main object of my new dual time-lock—namely, that of controlling the operation of the train-bolts or bolt-work of the safe or other secure receptacle—and will afterward point out how my new dual time-lock may also be used to control the operation of a combination-lock.

In the example illustrated, two train-bolts, $A'$ $A'$, are used for fastening the door A of the safe $A^x$. The train-bolts are rigidly united together by the connecting-bar $A^3$, and are mounted to slide in the frame-bars $A^2$ $A^2$ of the door, in the usual manner. The train-bolts are projected to fasten the door and retracted to open the door by the door-spindle or handle-arbor B through the medium of its fixed horn $B'$. The back or convex side of the horn acts on a rigid flange, $A^4$, of the connecting-bar $A^3$ in projecting the train-bolts, while the extreme end or hook of the horn draws upon the drag-pin $A^5$ of the said connecting-bar in retracting the train-bolts.

The drag-pin $A^5$ is shiftable from a point where the hook of the horn can engage it to a point where it is beyond the reach of said hook. To this end the drag-pin is secured to an arm, $A^6$, pivoted on the connecting-bar $A^3$, and is adapted to move from one end to the other of a slot, $A^7$, in said connecting-bar. In the present instance the relative arrangement of the parts is such that the drag-pin, when it is at the lower end of slot $A^7$, will be in position to be engaged by the hook of horn $B'$, whereas at the upper end of said slot $A^7$ the drag-pin cannot be reached or engaged by the hook of the horn. Whenever the drag-pin is moved up to the upper end of slot $A^7$, a toe, $A^8$, of its arm $A^6$ engages behind a shoulder, $A^{10}$, of a latch, $A^9$, pivoted on the connecting-bar $A^3$, and thus the drag-pin will be held out of reach of the hook of horn $B'$, and cannot return to a position where it can be reached and engaged by said hook until its arm $A^6$ has been first released from the latch $A^9$. On such release the drag-pin will drop by gravity to the lower end of slot $A^7$. The drag-pin projects from the connecting-bar $A^3$ far enough, of course, to be engaged by the hook of horn $B'$. Its return to the position where it can be engaged by said hook may be effected by a spring alone, or by gravity aided by a spring, instead of by gravity alone. The latch $A^9$ is actuated by gravity as well as by a spring, $A^{11}$, the free end of which presses against the pin or trigger $A^{12}$ on an arm of the latch. By pressing against the trigger $A^{12}$ in opposition to the spring $A^{11}$, the latch may be tripped to release arm $A^6$ of drag-pin $A^5$.

The shiftable drag-pin and latch constitute one form of mechanism for making and breaking operative communication between the door-spindle or handle-arbor B and the train-bolts or bolt-work of the safe. It is this mechanism or its equivalent which it is the purpose of my dual time-lock to control when used to simply guard the train-bolts or bolt-work of the safe.

Where the particular mechanism just described is employed the dual time-lock is required only to restore operative communication from the handle-arbor to the bolt-work by tripping the latch $A^9$. This function is performed by what may be termed "the controller" $C^5$ of the dual time-lock, which has in this instance the form of a lever. This controller $C^5$ can be brought into use for tripping latch $A^9$ at such times only as the time mechanism of the dual time-lock determines, and then it can be made operative only through the proper manipulation of the permutation mechanism of the dual time-lock.

In order that those who may have occasion to read this specification may attach the proper significance to the terms "time mechanism" and "permutation mechanism," I would state at the outset that by the use of these two separate terms I do not mean to convey the idea that they are two separate and distinct mechanisms, each capable, when separated from the other, of performing a separate and distinct function. On the contrary, these terms are used only for perspicuity of description, for the time mechanism cannot be removed without destroying the completeness of the permutation mechanism for the performance of a useful act, nor could the permutation mechanism be removed without destroying the completeness of the time mechanism for the performance of a useful act. They are a necessity to each other. In other words, they are merged in one structural whole, as hereinbefore stated.

It should be understood, also, that by the term "time mechanism" I do not mean to designate a clock-work or time-piece merely, but a mechanism which includes and is operated or controlled by such clock-work or time-piece.

If desired, my dual time-lock may be provided with its own arbor or spindle for operating the permutation mechanism thereof; but it is far preferable to construct the lock in such a way that it may be operated by the handle-arbor B, in which case but a single arbor is required to do the whole of the fastening and unfastening of the door. To this end I use a train of gear-wheels as a means of operative communication from the handle-arbor B to the dual time-lock.

One object of using several gear-wheels is to enable me to place the dual time-lock on the door removed from the handle-arbor far enough to provide for the necessary play of the bolt-work. Another object of using several gear-wheels will appear hereinafter.

Of this train of wheels, $B^2$ is the driving-pinion, fixed on the inner end of the handle-arbor, $B^3$ an intermediate wheel, and C the driver of the permutation mechanism. This train of wheels can be put in motion by the handle-arbor at any time and at all times, and made to turn in either direction.

The driver C turns on its supporting-shaft $C'$, fixed to the case X of the dual time-lock, and is reached by the intermediate wheel $B^3$ through a slot in the end of the lock-case. The shaft $C'$ also supports, at a little distance from the driver C, a disk, $C^2$, which I term "the permuter." This permuter also turns on its supporting-shaft, and is constructed with several concentric series of tapped holes, $C^3$. In the present case three such concentric series of tapped holes are shown. In one hole of each concentric series a pin or screw, $C^4$, is inserted, projecting from that face of the permuter which is averted from the driver C, and is in close proximity to the partition $X'$ of the case. The arm $C^x$ of the controller or lever $C^5$ has a projecting stud, $C^6$, which reaches to the permuter-face through a slot, $X^2$, in the partition $X'$, and is adapted to rest upon any one of the screws $C^4$, provided the controller is in the proper position for allowing any one of these screws to pass under the stud $C^6$.

It will be observed that after each lift of the controller the permuter has to be turned to place the appropriate screw $C^4$ under the stud $C^6$ for the support of the controller. By varying the relative positions of these screws any desired combination formula for successively setting them into positions for supporting the controller may be obtained. These screws or pins $C^4$ may therefore be termed the "permutation-studs."

The controller is mounted to turn on shaft $B^4$ of the intermediate wheel $B^3$, and is under the influence of a spring, $C^7$, which acts in opposition to any force that may be applied to lift the end of the controller having the stud $C^6$, and which will turn the controller back to its normal position whenever such lifting-force is withdrawn, unless, indeed, one of the permutation-studs $C^4$ of the permuter has been placed in position under the stud $C^6$ of the controller.

The slot $X^2$ in the partition $X'$ determines the normal position of the controller, permitting its stud $C^6$ to descend to about the axial line of the permuter C. The other arm, $C^{xx}$, of the controller reaches behind the connecting-bar $A^3$ of the bolt-work to swing clear of the trigger $A^{12}$ of latch $A^9$; but it has a projecting stud, $C^8$, the flat side of which, when this arm of the controller is turned down to its full extent, acts on trigger $A^{12}$ in opposition to spring $A^{11}$ thereof, and thus withdraws the latch $A^9$, thereby releasing arm $A^6$ and permitting drag-pin $A^5$ to descend to the lower end of slot $A^7$, so as to restore operative communication from the handle-arbor B to the bolt-work. This tripping of the latch $A^9$ can be effected only by lifting the arm $C^x$ of the controller so high that the outermost one of the studs $C^4$ of the permuter $C^2$ may pass under the stud $C^6$ of the controller for supporting the same.

Certain means, which will be described presently, are provided for turning the controller in opposition to its spring $C^7$ by successive lifts of the arm $C^x$ thereof. This lifting mechanism is so devised that a single lift will raise arm $C^x$ of the controller only a distance about equal to the space between the axial lines of two adjacent concentric series of tapped holes, $C^3$, in the permuter $C^2$, and the controller will be simply oscillated through this space by the opposing action of the lifting devices and spring $A^7$ unless a stud, $C^4$, of the permuter $C^2$ is turned under stud $C^6$ of the controller after each lift, to support the controller in the position to which it was lifted.

In order to transmit power from the driver alternately in opposite directions, I have devised and applied to it a reversible transmitter, $C^9$, which has the form of a disk, and is centrally pivoted in a recess of the driver, and has one driving-pin, $C^{11}$, projecting from its outer face, and another driving-pin, $C^{10}$, projecting from the inner face through a slot, $C^{12}$, in the driver.

The slot $C^{12}$ is so placed that one end is much nearer the center of the driver than the other end, so that it will admit of the shifting of the driving-pins $C^{10}$ and $C^{11}$ toward and away from the center of the driver.

The pin $C^{10}$ is to operate upon the mechanism for turning the controller in opposition to its spring, while the pin $C^{11}$ is to operate on the pin $C^{13}$ of the permuter to turn it. Pin $C^{13}$ of the permuter is so placed that it will be in the path of driving-pin $C^{11}$ when driving-pin $C^{10}$ is at the inner end of slot $C^{12}$, and in that position of the reversible transmitter its driving-pin $C^{10}$ will move in a circuit, where it cannot affect the lifting mechanism. The reverse is the case when driving-pin $C^{10}$ is at the outer end of slot $C^{12}$, for then the lifting mechanism is in the path of driving-pin $C^{10}$, while driving-pin $C^{11}$ moves in a circuit removed from pin $C^{13}$ of the permuter.

In the first-mentioned position of the reversible transmitter its driving-pin $C^{11}$ will act on the pin $C^{13}$ to turn the permuter, provided the driver C is turned in a certain direction; but if the driver C be turned in the opposite direction, then pin $C^{13}$ will act as a stop to pin $C^{11}$, and cause the turning of the reversible transmitter until its pin $C^{11}$ escapes from pin $C^{13}$, by which time driving-pin $C^{10}$ of the reversible transmitter has moved into position for action, and will act as long as the direction of motion of the driver is continued; but on again reversing the motion of the driver the position of the pins $C^{10}$ and $C^{11}$ of the reversible transmitter is again reversed, this time by the passive action of the lifting mechanism on pin $C^{10}$.

The permuter has ratchet-teeth on its periphery adapted to be engaged by a pawl, E, which is controlled by the time mechanism. When the time mechanism permits the pawl E to engage the ratchet-teeth of the permuter, the latter may be held by such pawl, so that it can turn only in the direction in which pin $C^{11}$ is intended to drive it.

The controller and pawl E act antagonistically on the permuter, so that unless the permuter is held by pawl E, the controller would turn the permuter and return to its normal position, even though the appropriate permutation-stud had been placed under its stud $C^6$.

The pawl E, or its equivalent, of the time mechanism is therefore an indispensable part of the permutation mechanism. In a certain small range of relative positions of the several pins $C^{10}$, $C^{11}$, and $C^{13}$, there is a tendency to a dead-lock at the time when pin $C^{13}$ should drive pin $C^{11}$ to push it aside. If such a dead-lock should occur with the pawl E holding the permuter, it might under certain circumstances prevent the setting up of the controller and cause a lock-out. To guard against this danger a portion of the periphery of the permuter is left blank, so that through the range of the possible dead-lock between the pins $C^{10}$, $C^{11}$, and $C^{13}$ the permuter cannot be held by pawl E, but will move back far enough to remove the dead-lock, so that pin $C^{13}$ may push pin $C^{11}$ aside, as required.

The arm $C^\times$ of the controller is of segmental form, and constructed with a series of ratchet-teeth, $C^{\times\times\times}$, which are engaged by pawl $D^3$. This pawl $D^3$ is pivoted to an arm, $D^2$, fixed on the shaft D, which is held under torsion by a spiral spring, $D'$, tending to turn the shaft so as to force its arm $D^2$ down against the fixed stop-pin $D^4$ on the back of partition X'.

Pawl $D^3$ moves along a fixed guide-pin, $D^5$, so placed that as the pawl descends with arm $D^2$ said pawl will be moved laterally by the guide-pin to disengage itself from the ratchet-segment of the controller, so that the controller may return to its normal position after any lift if not supported by one of the permutation-studs $C^4$ of the permuter. The shaft D also carries a fixed bell-crank, $D^6$, one arm, $D^7$, of which is adapted to be engaged by a trigger, $D^9$, when the shaft is turned in opposition to its torsion-spring, to effect a lifting of the controller through lifting-pawl $D^3$.

The trigger $D^9$ is loosely pivoted on a fixed stud, and has a tongue, $D^\times$, projecting so far across the face of the driver C that the trigger may either be tripped by driving-pin $C^{10}$, or may operate on the driving-pin $C^{10}$, and thereby reverse the reversible transmitter, according as the driver is turned in one direction or the other. The other arm, $D^8$, of the bell-crank $D^6$ projects across the face of the driver C, to be driven by driving-pin $C^{10}$ or to reverse the reversible transmitter, as the direction of motion of driver C may determine.

The result of the driving action of pin $C^{10}$ on trigger $D^9$ is the release of bell-crank $D^6$, whereupon the torsion-spring $D'$ will turn the shaft D until its arm $D^2$ brings up against stop-pin $D^4$. The pawl $D^3$ is at the same time pulled down by arm $D^2$ and disengaged from the ratchet-segment of the controller. As driving-pin $C^{10}$ progresses it strikes arm $D^8$ of bell-crank $D^6$, and through it turns shaft D in opposition to its spring, lifting arm $D^7$ of the bell-crank until it is again caught by trigger $D^9$. During this reverse motion of shaft D the pawl $D^3$ rises, engaging and lifting the controller. Thus the driving action of pin $C^{10}$ has the effect of alternately lifting and releasing the controller.

From the foregoing description it will be seen that the controller (so termed) is a device which requires to be moved stepwise from its normal position to the point where it provides for the retraction of the bolt or bolt-work, but which escapes intermittingly from the means by which it is moved, and is adapted then to replace itself in its normal position; also, that the permuter (so termed) is a device which requires to be advanced stepwise in working out the combination of the permutation mechanism.

The pawl E is pivoted so as to have a limited independent motion on one end of a lever, $E'$, which is fulcrumed on shaft D, and is attached with its other end to a stud on an arm, $F'$, of another lever, (also fulcrumed on shaft D,) having a long upright arm, F, extending across the front face of driver C, and yet a third arm, $F^2$, connected by a link, $F^3$, to a stud, $G^4$, on an arm, $G'$, fixed on a horizontal shaft, G. Arm $G'$ is located in front of partition $X^3$ of the case, and its stud $G^4$ passes through a slot, $G^5$, in said partition to the link $F^3$.

Shaft G is held under torsion by a spring, $G^3$, which tends to turn the shaft so as to carry stud $G^4$ of arm $G'$ to the upper extremity of slot $G^5$. In this position of stud $G^4$—namely, when it is at the upper end of slot $G^5$—the link $F^3$ holds arm $F^2$ of above-mentioned three-armed lever in such a position that its arm F will stand across the path of driving-pin $C^{10}$, while arm $F'$ holds lever $E'$ in such a position that its pawl E is some little distance removed from the periphery of the permuter, and cannot act thereon. The extremity of arm G' carries a gravitating-pawl, $G^2$, which engages the teeth of the ratchet-wheel H, mounted to turn freely on the main shaft I of the clock-work. The same direction of rotation of the driver C which causes its driving-pin $C^{10}$ to turn bell-crank $D^6$ also causes said driving-pin to throw arm F back, the effect of which is that lever F' is moved to throw pawl E against the periphery of the permuter and to draw arm G' down (in opposition to the torsion of spring $G^3$) so as to move the pawl $G^2$ some distance along the ratchet-wheel H. The pawl $G^2$ always retains a tangential position in relation to ratchet-wheel H to whatever point arm G' may be turned, and is therefore always prepared to turn the said ratchet-wheel so as to let arm G' return to its normal position under the impulse of torsion-spring $G^3$, which is excited immediately on the escape of driving-pin $C^{10}$ from arm F. Thus, unless the ratchet-wheel H is held stationary by some other means, the recoil of torsion-spring $G^3$ will immediately return the three-armed lever F F' $F^2$ to its normal position, and thereby remove pawl E from the periphery of the permuter, so that the latter cannot be held in position for giving support to the controller; but when the ratchet-wheel H is held stationary by some means or other, then the pawl $G^2$ will hold the various parts terminating with the pawl E in the position shown in Figs. 3 and 8, when the permuter can be held by said pawl E to give support to the controller, so that the dual time-lock may be unlocked.

A pawl, $H^3$, prevents the movement of the ratchet-wheel in any direction but that in which the pawl $G^2$ tends to travel under the influence of the torsion-spring $G^3$.

The temporary immovability of the ratchet-wheel H is thus an essential requisite for unlocking.

In order to meet the various requirements of users of time-locks and exigencies arising out of internal accidents, I have provided such means for holding fast the ratchet-wheel H, when required, as would seem to meet all probable occasions. One such means for locking the ratchet-wheel H, and which comes into play whenever the clock-work is stopped in opposition to the force of the wound mainspring, whether it be stopped by design or by accident, consists of a rocker, K, which carries a pivoted gravitating-pawl, K', adapted to bear against the toothed periphery of the crown or contrate wheel L of the clock-work.

The rocker K is pivoted on torsion-shaft G, and has a vertically-elongated slot, $K^2$, in which an eccentric hub, H', of ratchet-wheel H plays. The pawl K' is made quite light, and the descent of its weighted arm is limited by a stop-pin in such a way that when eccentric hub H' has thrown rocker K entirely away from the contrate-wheel L, then the pawl K' will point to the center of the contrate-wheel, so that said pawl may exert an approximately-radial pressure against the contrate-wheel on again moving the rocker toward the latter.

The contrate-wheel drives the escapement of the clock-work, and runs, of course, as long as and whenever the clock-work runs. Its direction of motion is such that it may trip pawl K' when wound up in contact with it.

As long as the contrate-wheel runs the pawl K' can obtain no fixed bearing against it, and consequently the rocker K will not permanently oppose the rotation of eccentric hub H' of the ratchet-wheel H. In other words, while the clock-work runs ratchet-wheel H cannot be locked by rocker K to provide for the unlocking of my dual time-lock; but when the contrate-wheel comes to a stand-still, then pawl K' obtains a bearing against its toothed periphery on the beginning of the return movement of the rocker K from its point of greatest distance from the contrate-wheel, and prevents the further movement of the rocker. The locking of the rocker K of course stops the further rotation of eccentric hub H', and thus ratchet-wheel H is also locked, and thereby the first step in the manipulation of unlocking my dual time-lock is effected. It will be observed that as the pawl K' will at this time press in an approximately-radial direction against the contrate-wheel, as above stated, this pressure will have no tendency to turn said contrate-wheel. The teeth on the periphery of the contrate-wheel will prevent the slipping of pawl K'.

In order to guard against the overbanking of the clock-work while running by pawl K', (when the rocker is moved in consequence of the rotation of ratchet-wheel H by torsion-spring $G^3$ through the described mechanism,) I link the upper extremity of rocker K by a link, $K^2$, to a crank-arm, $K^3$, mounted to turn on a shaft, $K^4$, which is encircled by a spiral spring, $K^5$. One end of this spring $K^5$ is fastened to shaft $K^4$, while the other end thereof is secured to crank-arm $K^3$, on which it acts torsionally.

The torsion-springs $K^5$ and $G^3$ act antagonistically so far as their effect on rocker K is concerned. Spring $G^3$ must, however, always overbalance spring $K^5$ somewhat.

The spring $K^5$ can be wound to regulate its power on the rocker K by turning shaft $K^4$, which carries a fixed ratchet-wheel, $K^6$, which is engaged by a stop-pawl, $K^7$, on partition $X^3$ of the case, to hold the shaft in any position to which it may be turned.

The mechanism just described will operate to lock the ratchet-wheel H, as the first step of unlocking my dual time-lock, whenever the clock-work is stopped, as above stated. The regular means for stopping the clock-work consists of an elbow, N', of a lever, N, presently to be further described. The elbow N' projects through a slot in partition $X^3$ beyond the face of the fixed ring-dial M, at the zero-line thereof, and checks the progress beyond it of the hand M' of the clock-work.

The hand is loosely pivoted on the main shaft I of the clock-work, but is provided with a toothed segment, $M^5$, for rigidly connecting it to the cogged wheel O', fixed on the dial center-wheel O, which is, in turn, fixed on said main shaft I. The toothed segment $M^5$ is placed on the back of the hand M', and has a stud projecting through a longitudinal slot in the hand, part of which stud is square, while the outer end of it is cylindrical and screw-threaded for the reception of a nut, $M^6$, by which the segment is clamped on the hand. (See Figs. 19 and 20.)

The slot in the hand is long enough to permit the segment, after unclamping it, to be moved on the hand for disengaging it from wheel O', when the hand may be turned to any desired point on the dial, and then reconnected to wheel O', so as to turn with shaft I. This mode of connecting the hand to shaft I makes it convenient to set the hand back on the dial without turning said shaft, which turning would involve a winding of the mainspring. Ordinarily, however, the hand is set back on the dial the number of hours which are to intervene between the closing of the safe on one day and the time of opening it on a succeeding day by turning shaft I, so that the clock-work is wound up at the close of every business-day.

In order that the hand may be readily set back the determined number of hours without requiring each time an inspection of the dial, I provide a shiftable stop-pin, $M^2$, which can be secured at any point around the ring-dial, to stop the backward turning of the hand. This stop-pin $M^2$ is attached to the free end of a spring, $M^3$, fastened to a circularly-movable ring, $M^4$, on the back of the ring-dial.

The spring $M^3$ has an inwardly-projecting tooth for engaging any one of a series of notches in the peripheral edge of the ring-dial. The number of notches corresponds to the number of time-lines on the face of the ring-dial.

The stop-pin is provided with a suitable pointer, reaching over the face of the ring-dial, to indicate its precise position. To shift the stop-pin, its retaining-spring $M^3$ is slightly unbent to disengage its tooth from the ring-dial, when the stop-pin may be moved by pulling or pushing it circularly around the ring-dial to bring its pointer over any time-line thereon, and on release of the stop-pin its spring $M^3$ will recoil, causing its tooth to re-enter one of the notches in the edge of the ring-dial, and to lock the stop-pin thereon by that means.

The next means I will describe for locking the ratchet-wheel H is intended to enable my dual time-lock to put itself automatically in the condition which provides for its unlocking, and to remain in such condition during predetermined periods of time, and while the clock-work is running uninterruptedly. This mechanism, though differing somewhat in details therefrom, is substantially like the mechanism for that purpose described in my aforesaid United States Letters Patent No. 199,520, and consists of the elbow-lever N, heretofore alluded to, one or more projections or cams, $O^2$, on the dial center-wheel O, one or more laterally-projecting pins, $H^2$, on the ratchet-wheel H, and a hook, $N^2$, formed on the elbow-lever N. The elbow-lever N is pivoted on the inside of the front partition, $X^3$, so that its hook $N^2$ is in the line and stands across the pins $H^2$ of ratchet-wheel H. The elbow-lever N has a weighted arm, so acting that in its normal condition its hook $N^2$ will be removed from the path of the pins $H^2$, so as not to interfere with the ratchet-wheel H, and the elbow N' of said lever will be in position to be acted upon by the projections or cams $O^2$ on the dial center-wheel. Now, when one of these projections $O^2$ comes around and acts upon or depresses the elbow N', the hook $N^2$ of lever N will be moved across the path of the pins $H^2$, and one or the other of said pins will bring up against said hook, and the ratchet-wheel H will be locked by that means. As long as the action of the projection or cam $O^2$ on the elbow-lever continues the ratchet-wheel H remains locked, and during that time my dual time-lock may be unlocked, although the clock-work is running.

It is obvious that the dial center-wheel may be constructed with a continuous series of tooth-like projections to alternately depress and release the elbow-lever N, and that these tooth-like projections may be so close together that the ratchet-wheel H would be locked and unlocked every few seconds, the locking-periods being so short that the controller could not be set up within such periods, rendering the unlocking of the dual time-lock impossible until the stoppage of the clock-work.

I have shown two such cams or projections, $O^2$, differing in length, and they are attached to the dial center-wheel by tenon and groove, as shown in Figs. 1 and 20, so that they may be adjusted on said dial center-wheel, and they are clamped thereto by set-screws.

I have also made a special provision for locking the ratchet-wheel H in the event of the breakage or running down of the mainspring. The locking of the ratchet-wheel H in such a case is also accomplished by the hook $N^2$ of the elbow-lever N through the following intervening devices: A bar, $N^7$, passes through an opening in the side of the mainspring case or barrel, and has an elbow, $N^8$, located on the interior of the barrel between its shell and the outer coil of the mainspring, as shown best in Fig. 10. There is some little play between the elbow $N^8$ and the shell of the barrel, and as long as the mainspring remains wound to some extent it will not act on the elbow $N^8$. The other end of the bar $N^7$ is pivoted to an arm, $N^6$, of a shaft, $N^5$, encircled by a spiral spring, $N^9$, which acts torsionally on said shaft, so as to push the bar $N^7$ toward the mainspring. Shaft $N^5$ is also provided with an arm, $N^4$, which reaches under a laterally-projecting pin, $N^3$, of elbow-lever N. Should the mainspring run down or break, it will push elbow $N^8$ of bar $N^7$ up against the shell of the barrel, in doing which shaft $N^5$ will be turned in opposition to its torsion-spring $N^9$, and its arm $N^4$ will operate on pin $N^3$ and lift the tail end of elbow-lever N so as to throw the hook $N^2$ thereof across the pins $H^2$ of the ratchet-wheel H and lock the latter.

In order to save the contrate-wheel as much as possible from being operated—that is, pressed upon by the pawl K′—I construct the hand M′ with curved projections $M^{15}$, to act on the elbow N′ of lever N the same as the projections $O^2$ on the dial center-wheel O do. Thus, whenever the hand is brought to a stop by the elbow N′, it has depressed the latter, and holds it down so as to throw the hook $N^2$ of lever N across the pins $H^2$ of the ratchet-wheel H.

The clock-work should be a well-constructed one, but may be of any known or preferred make. The mainspring I prefer, however, to make of several leaves or separate springs coiled within one another, as I have described in my United States Letters Patent No. 194,656. In order that the clock-work may be conveniently stopped when desired, I provide a dog, P, (shown in dotted lines, Fig. 8,) adapted to engage the teeth of one of the train of wheels of the clock-work. This dog is pivoted on the partition $X^3$, and has a screw-stud passing through a slot, P′, in said partition, and bearing with a shoulder against the front side thereof. The screw-stud clamps the dog to the partition, and by said screw-stud the dog may be moved to throw it in and out of gear, and be firmly held in either position.

The handle-arbor B carries the fixed dial R to aid in working out the combination of my dual time-lock. The gear-wheels $B^2$, $B^3$, and C are so proportioned in this instance that every three revolutions of the handle-arbor will impart one revolution to the gear wheel or driver C.

It is obvious that in order to work out the combination the position of the driving-pins $C^{10}$ and $C^{11}$ in the driver C must first be ascertained, and that this cannot be done by the dial R alone, because the said dial and driver C do not turn in unison. It is therefore necessary to introduce some additional means by which the position of said driving-pins may be definitely determined at any time by the person who knows the relation existing between said driving-pins, the dial on the handle-arbor, and the intervening devices. The said additional means consist of a cogged index-wheel, $R^2$, journaled in the dial-seat $R^3$ on the outside of the safe-door, and the cogged wheel R′ fixed on the handle-arbor. These wheels R′ and $R^2$ are in gear, and are located under the dial seat or plate $R^3$ fixed on the door. A slot, $R^4$, is cut through the dial-seat to expose a portion of the index-wheel, which has a series of suitably-marked radial lines upon its outer surface. (See Fig. 13.) A mark, $R^5$, is also made on the edge of the said slot $R^4$.

The wheels R′ $R^2$ are of unequal diameters, and are so proportioned that if any given line on the index-wheel $R^2$ registers with the mark $R^5$ on the dial-seat simultaneously with the registry of another given line on the dial R and said mark $R^5$, such coincident registry will not occur again until after a fixed number of revolutions of the arbor. At every such coincident registry the reversible transmitter of driver C, with its pins $C^{10}$ $C^{11}$, will always be in a certain position known to the person in possession of the combination for opening my dual time-lock.

After determining in the aforesaid manner the position of the reversible transmitter, the combination may be readily worked out. The dial on the handle-arbor, together with the wheels R′ $R^2$ requiring to be turned so as to assume certain definite relative positions preparatory to the working out of the combination of the dual time-lock, actually constitute an additional combination—a guard, so to speak, on the main combination. Where the arbor-pinion $B^2$ has as many teeth as the driver C, so that one turn of the arbor will impart one revolution to the driver, the wheels R′ and $R^2$ may, of course, be dispensed with.

In the dual time-lock so far as described the permuter $C^2$ is located near the rear partition, X′, and its permutable studs $C^4$ face rearwardly. In changing the combination of these permutable studs the lock is first detached from the safe-door, and then a suitable instrument introduced through a hole, $X^4$, in the back of the lock-case, reaching through the slot $X^2$ in the partition X′. By this instrument the permutable studs may then be changed in position.

After the lock has been replaced on the door the permutable studs cannot be seen. It therefore becomes necessary to provide some means for determining on the exterior of the lock-case the new positions of the respective studs to ascertain the new combination. To this end I attach a rigid arm, S, to the shaft $B^4$, reaching into the lock-case just in front of the controller $C^5$, and terminating in a flat elbow, S′, projecting toward the face of the permuter $C^2$ through slot $X^2$ in partition X′.

The distance of the elbow S′ from the center of shaft $B^4$ is the same as the distance of the outer edge of the stud $C^6$ of the controller from the center of said shaft $B^4$, so that when the elbow S′ is arranged in the line of the circle of any one of the concentric series of tapped holes of the permuter the stud $C^4$ in that series of holes will, on rotating the permuter, be stopped by said elbow in the exact position which said stud must occupy to support the stud $C^6$ of the controller.

A segment, $S^2$, is fixed on the outer end of the shaft $B^4$, having a series of notches, $S^3$, corresponding to the number of series of tapped holes in the permuter. A spring-pawl, $S^4$, is adapted to engage any one of the notches in the segment $S^3$ to prevent it from turning too easily. The arrangement is such that when pawl $S^4$ engages the upper notch of the segment $S^2$ the elbow $S'$ will be in line with the innermost concentric series of tapped holes in the permuter.

To ascertain the new combination the handle-arbor is first turned to lift the controller a single lift. The handle-arbor is then turned in the opposite direction to drive the permuter until the permutation-stud in one of its innermost series of holes brings up against elbow $S'$, which stops the further rotation of the permuter and places the said innermost permutation-stud under stud $C^6$ of the controller. A note is then made of the respective lines of the dial R and the index-wheel $R^2$ which register with the mark $R^5$ on the fixed dial-seat $R^3$. Thereafter (whenever the arbor is turned in a direction to drive the permuter) on the coincident registry of these noted lines with the mark $R^5$ the innermost permutation-stud of the permuter will be in position to give support to the controller. The handle-arbor is then again reversed and turned far enough to lift the controller the second lift. In the meanwhile shaft $B^4$ may be turned so as to bring the second notch of segment $S^2$ in position to be engaged by pawl $S^4$, whereby the elbow $S'$ will be placed in line with the second series of tapped holes in the permuter. The permutation-stud in this second series of holes may then be put in position for supporting the controller, and a note made of the respective lines on the dial R and index-wheel $R^2$ which then register with the mark $R^5$, in the same manner as was done with the innermost permutation-stud. The alternate lifting of the controller and setting of the permuter are thus proceeded with until the entire combination has been ascertained.

The segment $S^2$ is provided with an extra notch, $S^5$, so located that when the pawl $S^4$ engages that notch the elbow $S'$ of arm S will be in a position so as not to interfere with the free rotation of the permuter. An extra segment with a single shoulder might be provided for holding the arm S in this position, so that the segment $S^2$ may be removed to prevent the surreptitious ascertainment of the combination of the permutation mechanism by an unauthorized person.

It takes some little time to work out the whole of the combination of my dual time-lock, and in order to save a banker the trouble of working out the whole of the combination every time he has to open the safe in the course of the day, I provide a simple means which will enable him to put the permutation mechanism in such a condition that to unlock it but a part of the combination will have to be worked out—one step or more. In the present instance, where the controller is in the rear of the wheel $B^3$, this means consists of a lifter-rod, T, a lever, $T'$, for operating said lifter-rod, a spring-bolt, $T^2$, on the lever, and a series of holes, $T^3$, in the lock-case, into one or the other of which the spring-bolt may enter to lock the lever. The lifter-rod T has an elbow reaching under the controller, so that it may lift and support the latter in any position. The holes $T^3$ are so distanced that in moving the lever from one hole to the other the lifter T will lift the controller one lift, or allow it to descend that distance, as the case may be. Thus, where the controller, to work out the whole of the combination, has to be lifted three successive lifts, it may be held so elevated by the lifter T that but a single additional lift will be required to cause it to restore operative communication from the handle-arbor to the drag-pin of the bolt-work. This mechanism—a very simple and effective one—is clearly shown in Fig. 26.

If so desired, the controller $C^5$ may be provided at the extremity of the arm which acts on the pin $A^{12}$ of the latch $A^9$ with a laterally-projecting boss, $C^{14}$, to enter between the flange $A^4$ of the bolt-work and a rigid pin or projection, $C^{15}$, on the door of the safe. This boss will thus serve to dog the bolt-work, and that without permitting the weight of the bolt-work, in case the safe be turned on its side, to exert any appreciable pressure upon the mechanism of the dual time-lock.

When used, the boss $C^{14}$ should be made long enough or high enough to remain between the flange $A^4$ and pin $C^{15}$ during the first lift of the controller, at least.

Where it is desired to use my dual time-lock for controlling a combination-lock, an arm, U, may be attached to shaft G, to reach down into the combination-lock for the purpose of so acting on one of the parts of the combination-lock that the latter cannot be set up for unlocking, except at such times as may be determined by the dual time-lock by the locking of its ratchet-wheel H, as heretofore explained. To this end the arm U may operate upon a stud, $U^2$, for suspending the action of friction-pawl $U'$, which forms one of the essential elements of a combination-lock invented by me, an application for Letters Patent for which I am about to file. This is shown in Fig. 3; or it may act, as shown in Fig. 16, upon a one-way pawl of one of the tumblers of a tumbler combination-lock.

The dogging means of the bolt-work (shown in Fig. 27) consist of a dog, 52, pivoted on the rear end of one of the train-bolts, and acting partly by gravity and partly by reason of the action upon it of a projection, 53, on the rear frame-bar, $A^2$, of the bolt-work. In using such a dog advantage is taken of the fact that there must, in all sizes of safes, be sufficient room between the side of the safe and the rear ends of the train-bolts to admit of the retraction of the latter from a locking position when the door of the safe is closed. However, this dog may be hinged anywhere to the train-bolts where two projections can be had on the safe-door, one of the projections to act on the said dog for forcing it into a notch in the train-bolt, or behind a shoulder thereon, and the other projection to serve as a stop.

In the example illustrated, where the dog plays in the space between the end of the train-bolt and the side of the safe, the dog is turned by the projection 53 on throwing the train-bolts, and will nearly fill this space, so that the bolts cannot be retracted unless the dog is withdrawn at the same time. By the retraction of the train-bolts the dog is moved away from the projection 53, and falls by gravity from behind the bolts. The dog 52 (illustrated in detail in Fig. 28) cannot move past a laterally-projecting pin, 54, of the train-bolt in an upward direction.

It is obvious that a dog of this kind is not affected by the mere overturning of the safe, for pin 54 is bound to hold it behind the bolt, and projection 53 holds it there as long as the bolt-work is shot. The only possible way of withdrawing the dog is by retracting the bolt-work.

In order to guard against the gradual retraction of the bolt-work by blows struck against the outside of the safe-door when the safe is slightly tilted, I provide a pendulous stop-bar, 55, pivoted at its upper end on the frame-bar $A^2$, so that its lower end will swing over the horn 56 of the dog 52 the moment the safe is tilted, and thus lock the dog. The swing of the stop-bar is limited by a pin on the frame-bar engaging the slot in the stop-bar, as shown.

Figure 42:
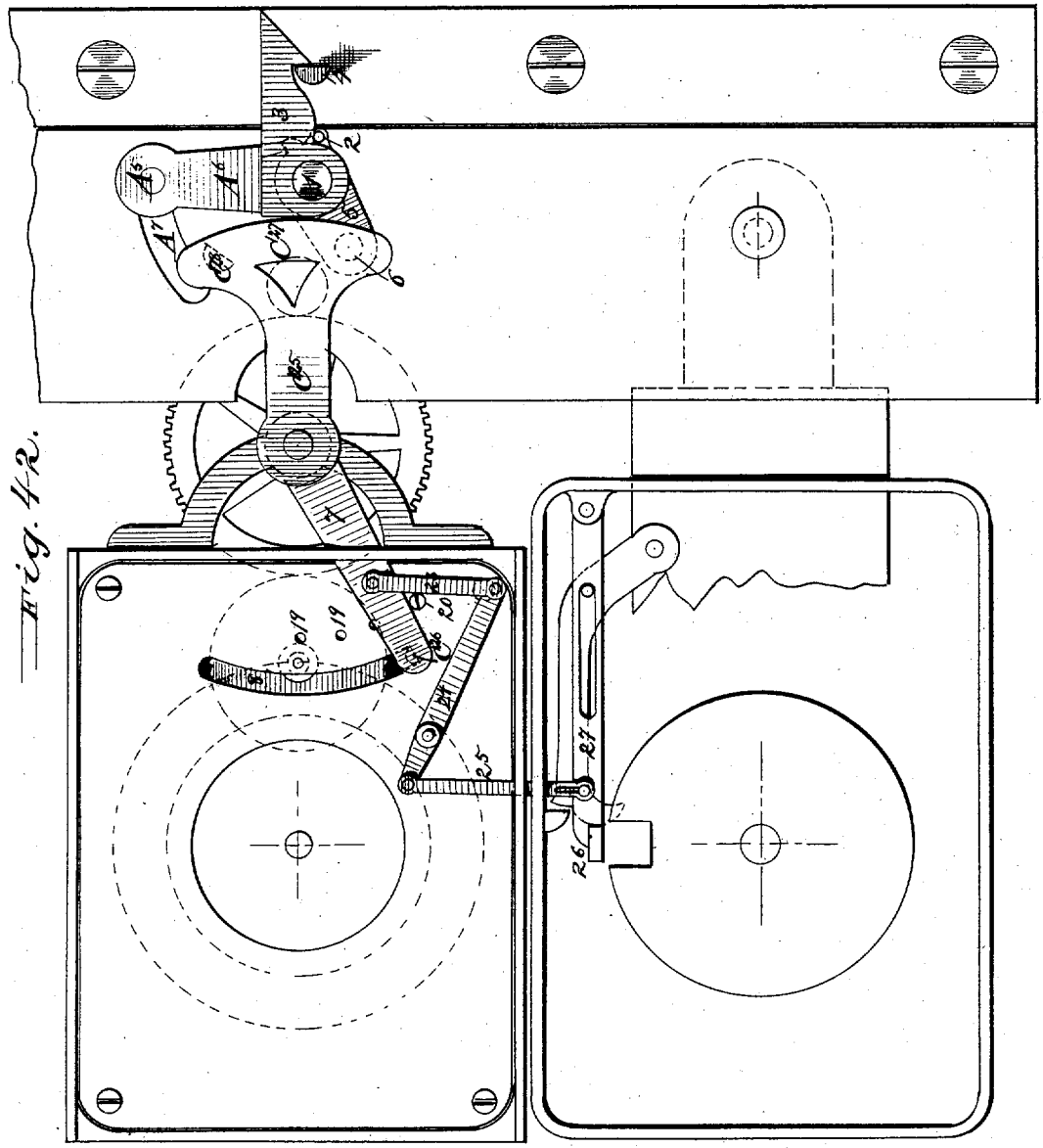

Some other forms of my invention and modifications of parts of the dual time-lock illustrated in the first eight sheets of drawings are shown in the last six sheets of drawings, where Fig. 30 is a front elevation of the second form of a dual time-lock. Fig. 31 is a plan view of parts of this second form of the invention. Fig. 32 is a more complete sectional plan view of the same. Fig. 33 is a front elevation of the dial thereof, and of parts connected with said dial. Fig. 34 is a sectional end view of the same form. Fig. 35 is a modification of the mechanism for locking the time mechanism in case the mainspring breaks or runs down. Fig. 36 is a front elevation of a modification to adapt my dual time-lock for controlling the angle-bar of an ordinary tumbler combination-lock. Fig. 37 is a sectional end elevation of the modification shown in Fig. 36. Fig. 38 is another modification to adapt my dual time-lock for controlling the angle-bar of an ordinary tumbler combination-lock. Fig. 39 is a sectional end elevation of the modification shown in Fig. 38. Fig. 40 illustrates still another and very simple form of my invention, it being a front elevation showing some of the principal parts of a dual time-lock. Fig. 41 is a sectional plan view of the dual time-lock illustrated by the preceding figure. Fig. 42 illustrates, in front elevation, the manner in which the dual time-lock shown in Figs. 40 and 41 may also be adapted for controlling the angle-bar of an ordinary tumbler combination-lock.

In the description of these various modifications, those parts which are identical with parts of the dual time-lock illustrated in the first eight sheets of drawings are designated by the same letters of reference used for them in said first eight sheets of drawings.

The modified form of my dual time-lock illustrated in Figs. 30, 31, 32, 33, and 34 controls a device for making and breaking operative communication from the handle-arbor to the bolt-work, composed of a rule-jointed lever, one arm, $a$, of which is provided with a claw, $a^2$, which permanently engages the now fixed drag-pin $A^{15}$ of the bolt-work, and is adapted to engage also a pin, $b'$, on the drive-wheel $b$ of the handle-arbor B. The rule-jointed lever is pivoted by its joint-pin on the back of one of the train-bolts $A'$, as shown best in Fig. 31.

A link, $a^3$, depends from the outer end of the arm $a'$ of the rule-jointed lever into the lock-case, and is provided with a slot, $a^4$, engaged by the pin $c'$ of a crank-arm, $c$, fixed on the rear end of a rock-shaft, $c^3$, the other end of which carries a crank-arm, $c^4$. The arm $a'$ has an elongated slot, $a^5$, so that it may move crosswise of the link $a^3$ in throwing the bolt-work.

A wheel, $d$, loosely mounted on the main shaft I of the clock-work, has an arm, $d'$, connected by link $c^2$ to the crank-arm $c^4$, and another arm, $d^2$, projecting across the front face of a disk, $e$, loosely mounted on the shaft $C'$ of the driver C. One-half of the front face of the disk $e$ is blank, while the other half is provided with a series of cam-grades or cam-blades—three in this instance—marked, respectively, $e'$, $e^2$, and $e^3$, while its rear face has a stud, $e^4$, through which motion can be imparted to the disk in one direction by the driving-pin $C^{10}$ of the reversible transmitter of the driver C. To prevent its turning in the opposite direction it may be provided with ratchet-teeth engaged on a pawl of a fixed stud.

The arm $d^2$ of wheel $d$ is provided with a stud, $d^3$, which enters between and is acted upon by the cam-grades on the front face of disk $e$. The rock-shaft $c^3$ is acted upon by a spring, $c^5$, the stress of which tends to turn the rock-shaft in a direction to force down arm $d'$ of wheel $d$, so as to throw arm $d^2$ of said wheel toward the center of the disk $e$ until its pin $d^3$ strikes the hub of the innermost cam-grade $e'$. When the arm $d^2$ of wheel $d$ is in this position, which is its normal position, then its arm $d'$ has drawn the link $c^2$ and arms $c^4$ and $c$ down so far that the pin $c'$ exerts no lifting effect on the link $a^3$, but, on the contrary, allows the said link $a^3$ to descend and the rule-jointed lever to maintain or assume a position in which the claw $a^2$ is lifted to a point where it cannot be engaged by the pin $b'$ on the drive-wheel $b$ of the handle-arbor B, and the slot $a^4$ is so long that the lifting of the link $c^2$ in consequence of the action of the first cam-grade, $e'$, will elevate the pin $c'$ only to the upper end of said slot $a^4$, without, of course, exerting any lifting action on link $a^3$. The arm $a'$ of the rule-jointed lever is provided with a rearwardly-projecting stud, $a^6$, which, when the said arm $a'$ is in its lowest position, is engaged by the hook of a gravitating-latch, $a^7$, pivoted to a fixed stud, and provided with a laterally-projecting pin, $a^8$, on its weighted arm. This pin $a^8$ is struck by the elongation $c^6$ of arm $c$ to unlatch the arm $a'$ at the finish of the first lift of arm $c$, due to the action of the first cam-grade, $e'$, of disk $e$. As long as arm $a'$ of the rule-jointed lever remains latched its arm $a$ cannot descend to engage with its claw the pin $b'$ of the drive-wheel $b$.

Wheel $d$ has two or more pawls, $d^4$, engaging the teeth of ratchet-wheel $H^{20}$, which is loose on the main shaft I of the clock-work, and must be locked before the wheel $d$ can be held at a point to which any of the cam-grades of disk $e$ may turn it. As long as the ratchet-wheel $H^{20}$ remains loose it will not, of course, sustain wheel $d$ against the reaction of spring $c^5$. Ratchet-wheel $H^{20}$ has a rearwardly-projecting pin, $h$, adapted to drive a pawl, $h'$, on a pivoted segment, $h^2$, said pawl $h'$ operating upon a loose ratchet-wheel, $h^3$, on shaft I. Ratchet-wheel $h^3$ has also a rearwardly-projecting pin, $h^4$, which travels in the same circuit as a pin, $h^6$, on a wheel, $h^5$, driven by the contrate-wheel of the clock-work.

It will be seen that as long as the clock-work is running the ratchet-wheel $H^{20}$ cannot be locked by the pin $h^5$ through the intermediate parts described, because said pin $h^5$ is constantly traveling, and affords no permanent abutment. The motion of $h^2$ in response to the action of pin $h$ is opposed by a spring, $h^7$, the tension of which is so regulated that it will be somewhat overbalanced by the tension of the counteracting-spring $c^5$. The spring $h^7$ modifies the action of spring $c^5$, and prevents acceleration of the clock-work by excessively rapid rotations of the disk $e$. When ratchet-wheel $H^{20}$ has been locked the arm $a'$ of the rule-jointed lever can be lifted by the successive action of the cam-grades on disk $e$ as high as is required, to let claw $a^2$ of arm $a$ engage pin $b'$ on drive-wheel $b$. Means are also provided for lifting arm $a'$ of the rule-jointed lever at certain determined periods of time during the continuous movement of the clock-work. To this end the lower portion of the periphery of wheel $d$ has a series of ratchet-teeth, which are engaged by a gravitating-pawl, $g$, when the elbow $N'$ of lever X is depressed either by the horn on the hand $M'$ or by any one of the cams or projections $O^2$ on the dial center-wheel O. When wheel $d$ is thus engaged by pawl $g$ it will be held at any point to which the cam-grades of disk $e$ may turn it, so that then the arm $a'$ of the rule-jointed lever may be lifted to its highest elevation to allow the descent of the arm $a$ for establishing operative communication from the handle-arbor to the bolt-work.

Besides the support the arm $a$ of the rule-jointed lever derives from the arm $a'$ thereof, it is also supported in its elevated position by an anti-friction roller on a stiff spring-arm, $i$, acting on the inclined back of a downwardly-projecting shoulder, $a^9$, on said arm $a$. This spring-arm is secured to a loose sleeve, $i'$, on a shaft, $i^2$. The sleeve $i'$ has an upwardly-projecting arm, $i^3$, and a downwardly-projecting toe, $i^4$, which latter hooks behind the hook of a gravitating-latch, $i^5$, (pivoted to the rear bracket on the end of the lock-case,) when spring-arm $i$ is in position for holding the arm $a$ of the rule-jointed lever elevated. Thus latch $i^5$ requires to be tripped before the arm $a$ of the rule-jointed lever can descend. This is effected by the following means: The outer end of shaft $i^2$ has a fixed arm, $f$, a stud, $f'$, of which projects toward the front face of the disk $e$, so that the cam-grades thereof can act on said stud. Another arm, $k$, also fixed on the shaft $i^2$, carries a bar, $k'$, which projects into the lock-case across the permuter $C^2$, and has a pin, $k^2$, to bear against any one of the permutation-studs when brought into proper position. A spiral spring, $f^2$, encircling the shaft $i^2$, is permanently fixed at one end, while its other end is attached to arm $k$. The spring is under tension, and tends to turn the shaft $i^2$ so as to throw the arm $f$ toward the center of the disk $e$. When the arm $f$ has been moved from the center of the disk $e$ nearly as far as the cam-grade $e^3$ can move it, then a projection or pin on arm $k$ strikes a laterally-projecting pin, $i^6$, of an arm of gravitating-latch $i^5$, and trips the latter by the time cam-grade $e^3$ has spent its whole throw; but spring $f^2$ will return the arm $f$ to its normal position every time its pin $f'$ escapes from the first cam-grade, $e'$, unless the proper one of the permutation-studs of the permuter is first brought into position to afford an abutment for the stud $k^2$ of the bar $k'$ to hold the arm $k$ in the position to which it may have been turned by the action of said cam-grade $e'$ on the arm $f$. In like manner must a permutation-stud be brought into position for abutment after the second cam-grade has completed its throw. Thus the driver must be turned first to turn the disk $e$ just so far that the first cam-grade will complete its throw and yet hold the arm $f$. Then the motion of the driver must be reversed to turn the permuter to bring its innermost permutation-stud in position to serve as an abutment for bar $k'$. The motion of the driver is again reversed after that to again drive the disk $e$, when the arm $f$ will be further turned by the second cam-grade, $e^2$, the permuter being brought into action as before, and so the operation is continued until the latch $i^5$ has been unlatched, as before stated.

The permuter can turn in one direction only, and may have a series of ratchet-teeth engaged by a pawl to prevent it from turning in the opposite direction.

When the rule-jointed lever is up, so that the claw of its arm $a$ cannot be engaged by the pin of the drive-wheel, then a shoulder, $a^{10}$, on said arm $a$ is behind a fixed stud, $a^{11}$, on the door of the safe, whereby the bolt-work is dogged.

In the third form of my dual time-lock shown in Figs. 40, 41, and 42, the controller $C^{25}$ both makes and breaks operative communication from the handle-arbor to the bolt-work by its projection $C^{28}$.

The arm $A^6$ of the drag-pin $A^5$ of the bolt-work is pivoted upon a fixed stud, 1, on the connecting-bar $A^3$ of the bolt-work, and has an outwardly-projecting pin, 2, reaching under a latch, 3, pivoted upon stud 1, and adapted to hook over a stud, 4, on the frame-bar $A^2$. Another arm, 5, pivoted on stud 1, is jointed rule-joint fashion to arm $A^6$, and is provided with a stud, 6, to be operated upon by the stud $C^{28}$ of the controller.

The arm $C^{27}$ of the controller terminates in a segmental end, adapted to operate on the butt-end of latch 3 to throw it over the stud 4, and to hold it in that position as long as the controller continues to prevent operative communication from the handle-arbor to the bolt-work.

As the latch 3 is thrown over the stud 4 by the segmental end of the controller the latch strikes pin 2, and thereby turns arm $A^6$ so as to carry the drag-pin $A^5$ up to the upper end of slot $A^7$, where it is out of the reach of the hook of the horn $B'$ of the handle-arbor B. In that condition of things the latch 3 dogs the bolt-work, and no pressure can be exerted by the weight of the bolt-work upon the dual time-lock.

In unlocking, the stud $C^{28}$, during the last lift of the controller, strikes pin 6 of arm 5, (its segmental end at the same time escaping from the latch 3,) and by depressing said arm 5 turns arm $A^6$ so as to carry drag-pin $A^5$ to the lower end of slot $A^7$, where it can be reached by the horn of the handle-arbor, and also throws up latch 3, through the medium of pin 2 on arm $A^6$, so as to unlatch the bolt-work from the fixed stud 4 of its frame-bar.

The permuter $C^2$ in this lock is placed in front of the driver C for supporting an arm, 7, of the controller, which now carries its supporting-stud $C^{26}$, projecting through a slot, 8, in the front partition of the lock-case, as best shown in Figs. 41 and 42.

The controller is fixed on shaft $B^4$, on which is also fixed a segment, 9, which forms part of the controller, and projects through a slot in the end of the lock-case in the rear of driver C.

Spring $C^7$ is used as in the first form of my dual time-lock, tending to hold the controller in its normal position—that shown in Figs. 41 and 42.

The edge of the segment 9 has a series of teeth adapted to be operated upon by the driving-pin $C^{10}$ of the reversible transmitter of the driver C for lifting the controller. A gravitating-pawl, 10, pivoted on a fixed stud on the back partition of the case, engages the teeth of segment 9, and has a rule-jointed arm, 11, in the path of driving-pin $C^{10}$, by means of which the pawl may be disengaged from the segment when the said driving-pin $C^{10}$ travels in a direction for operating on the segment 9 to lift the controller.

The arm 7 of the controller is arranged to sweep across the entire face of the permuter, so that its permutation-studs may support the stud $C^{26}$ of the controller both below and above the axis of the permuter. In consequence of this arrangement the combination required to be worked out in unlocking may consist of twice as many steps as there are permutation-studs. Thus in the present instance there are but two permutation-studs, while the controller has to be elevated the distance of four lifts to establish operative communication between the handle-arbor and the bolt-work.

By means of a series of tapped holes, 19, in the front partition of the lock-case, and a screw, 20, the arm 7 of the controller may be supported at different elevations, according as it is desired to use one or more steps of the combination, as heretofore explained, in connection with the first form of my invention described.

Where the segment 9 is provided with large teeth, which would cause greater lifts of the controller than are required, the excess of each lift may be compensated by lost motion between the teeth of the segment and the pawl 10. Unless the permuter, after it has been set up to place one of its permutation-studs under the stud $C^{26}$ of the lifted controller, is held against return motion, the stress of spring $C^7$ will force the controller down as soon as released from pawl 10, the permutation-stud escaping from under its stud $C^{26}$.

The return motion of the permuter is prevented at determinate times by the pawl 12, pivoted on the upper extremity of a gravitating arm, 13, on the main shaft I of the clock-work, which arm 13 also carries a pallet, 14, connected rule-joint fashion with pawl 12, and reaching to the periphery of contrate-wheel L.

The gravitating-arm 13 is operated upon by a pin, 16, (to throw pawl 12 into the ratchet-teeth of the permuter,) on an upwardly-projecting arm of a lever, 15, pivoted on the main shaft I, and reaching past the rear face of the driver C, by the driving-pin $C^{10}$ of the reversible transmitter of which it can be depressed in opposition to the stress of the spring on shaft $G^{20}$, which shaft is connected by a segmental gear, 17, to a segmental gear, 18, formed on said lever 15. Thus, unless contrate-wheel L stands still in consequence of the stoppage of the clock-work, and affords a permanent support to pallet 14, the reaction of the spring on shaft $G^{20}$ will return lever 15 to its normal position, so as to allow gravitating-arm 13 to turn in response to the action of its weight, and to disengage the permuter from pawl 12, for the revolution of the contrate-wheel will trip pallet 14, and by depressing it allow arm 13 to carry it under the contrate-wheel. In turning downward on arm 13, pallet 14 will throw up pawl 12 by reason of its rule-jointed connection therewith. The depression of lever 15 by the driving-pin $C^{10}$ of driver C causes pallet 14 and pawl 12 to be arranged on an extended radius of the contrate-wheel L, as shown in Fig. 40, so that any pressure transmitted from the permuter through the pawl 12 and pallet 14 will act radially on the contrate-wheel, and be borne by the shaft thereof without any tendency to turn the contrate-wheel.

Shaft $G^{20}$ is provided with a gravitating-arm, 21, adapted to operate on a pin, 22, and turn the shaft when forced over by any one of the projections $O^2$ of the dial center-wheel. This will have the effect of throwing pawl 12 on the permuter, and of maintaining their engagement during the operation of said projection $O^2$ on arm 21, during which time the lock may be unlocked notwithstanding the clock-work may be running.

This form of my dual time-lock may be conveniently combined with an ordinary tumbler combination-lock to control the angle-bar thereof. To this end the arm 7 is connected by a link, 23, to the long arm of a lever, 24, the short arm of which is connected, by a link, 25, to the outer end of the arm 27 of the angle-bar 26 of the combination-lock, the arrangement being such that the angle-bar cannot descend far enough for engagement with the tumbler until the controller has been lifted up all the way.

The operation of the second and third forms of my invention of dual time-lock will be readily understood from the descriptions particularly referring to those two forms when read in connection with what has been said about the first form of my invention.

The mechanism shown in Fig. 35 is more particularly adapted to the form of lock shown in Figs. 40, 41, and 42. The mainspring, in breaking or running down, acts here upon an angle-bar, 29, connected to a crank-arm, 28, on the rear end of shaft $G^{20}$, turning the latter in opposition to the stress of its spring $G^{23}$.

The mechanism shown in Fig. 45 is, on the contrary, more especially adapted to the first and second forms of my invention, hereinbefore described. The two leaves of the mainspring, in this instance, are connected to studs 31 and 32 of a sleeve, 30, on the main shaft I of the clock-work. The sleeve has a spiral-like groove or slot, 35, engaged by a stud, 34, on the main shaft. Sleeve 30 has a grooved collar, 36, which engages one arm of a lever, 37, the other arm of which engages a bell-crank, 38, adapted to operate on the elbow-lever N. (Not shown in this figure.)

As long as the mainspring remains wound the sleeve 30 remains in the position shown and bell-crank 38 has no effect on elbow-lever N; but when the spring runs down or breaks the sleeve 30 moves toward the back of the spring case or barrel, and thereby turns lever 37, which in turn acts on bell-crank 38 to operate on elbow-lever N for locking the ratchet-wheel H. (Not shown.)

In Figs. 36 and 37 the contrate-wheel L operates upon a gravitating-pawl, 39, pivoted upon the stud 40 upon the front partition of the lock-case, and provided with another pawl, 41, which engages a large ratchet-wheel, 42, loosely mounted on the main shaft I, and provided with a smaller ratchet-wheel, 43, fixed upon its hub. The small ratchet 43 is engaged by a pawl, 45, on the upper arm of the connecting-lever 44, the lower arm of which reaches into an ordinary tumbler combination-lock, and is provided with a hook, 46, to hold the angle-bar 47 of the combination-lock suspended. As the one-way pawl $U^3$ on one of the tumblers of the combination-lock strikes the lower end of the connecting-lever 44 on the flat side, it turns the lever so as to release the angle-bar 47 from its hook. If ratchet-wheels 42 and 43 are stationary, then pawl 45 will hold the connecting-lever 44 in the position to which it may be turned by the pawl $U^3$ of the combination-lock tumbler, so that then the angle-bar 47 may descend into the notches of the tumblers after they have been set up; but if said ratchet-wheels are not held stationary, then the weight of the connecting-lever will turn them by pawl 45, and hook 46 thereof will again enter under and support the angle-bar. As long as the clock-work runs ratchet-wheel 42 cannot be held by pawl 41, for the contrate-wheel, by constantly tripping pawl 39, continually disengages ratchet-wheel 42 from pawl 41; but when the clock-work stops, then the connected ratchet-wheels 42 and 43 will be held by pawl 41.

It will be observed that stud-pin 40 will sustain all the pressure transmitted through connecting-lever 44, and that no pressure will be put on the contrate-wheel and the clock-work.

The arrangement shown in Figs. 38 and 39 for controlling the angle-bar of an ordinary tumbler combination-lock by connecting-lever 44 includes a rocker, 48, carrying a pawl, 49, that reaches toward the periphery of the contrate-wheel L. The small ratchet 43, operated upon by the pawl 45 of the connecting-lever, is here secured to the hub of a large pin-wheel, 50, which is provided with an eccentric ring, 51, which operates within the yoke of the rocker 48. As long as the clock-work runs the rocker cannot be held to fix the ratchet 43, for the pawl 49 is constantly tripped by the contrate-wheel, whereas it must find a fixed support on said contrate-wheel before the rocker can be held stationary. When the clock-work stops running cam-ring 51 becomes locked, (on turning it by the connecting-lever 44 through its pawl 45 and the ratchet-wheel 43 so far as to bring pawl 49 of the rocker against the contrate-wheel,) and then the connecting-lever will remain in the position to which it may be turned by the operation of the combination-lock.

It will be observed that in this arrangement the pressure on the contrate-wheel is reduced to a minimum, as the leverage upon it by the connecting-lever 44 is reduced by the intervening parts.

Fig. 46 shows a flexible shaft, such as used by dentists for transmitting motion, which may be used in connection with proper gear-wheels to transmit motion from the handle-arbor to the driver C of my dual time-lock.

What I claim as my invention, and desire to secure by Letters Patent, is—

1. A dual time-lock, substantially as before set forth, consisting of a unitary piece of mechanism embodying the principles of a time attachment for locks and the principles of a non-time or combination lock.

2. The combination, substantially as before set forth, of a dual time-lock, the handle-arbor of the safe-door, the bolt-work, and the mechanism for making and breaking operative communication from the handle-arbor to the bolt-work subject to the controller of said dual time-lock.

3. The combination, substantially as before set forth, of the handle-arbor of the safe-door, the bolt-work, means for making and breaking operative communication from said handle-arbor to said bolt-work, a separate non-time or combination lock, and a dual time-lock containing one branch of mechanism for controlling the means for making and breaking operative communication from the handle-arbor to the bolt-work, and another branch of mechanism for controlling the non-time or combination lock.

4. In a permutation mechanism for guarding the bolt or bolt-work of a lock, a self-replacing controller, substantially as before set forth, consisting of a device which is movable stepwise from its normal position to the point where it provides for the retraction of the bolt or bolt-work, but which escapes intermittingly from its impelling means.

5. In a permutation mechanism for guarding the bolt or bolt-work of a lock, a permuter, substantially as before set forth, consisting of a device which requires to be advanced stepwise in working out the combination.

6. In a permutation mechanism for guarding the bolt or bolt-work of a lock, the combination, substantially as before set forth, of a self-replacing controller and a permuter which (in unlocking) require to be moved stepwise in alternation—namely, the controller to be moved from its normal position to the point where it provides for the retraction of the bolt or bolt-work, and the permuter to successively support the controller after each advance.

7. In a permutation mechanism, a permuter, substantially as before set forth, consisting of a device which requires to be advanced stepwise in working out the combination, and which has a number of holes, in one or more of which projecting studs are inserted, by changing which studs the permuter is capable of yielding different combinations.

8. In a permutation mechanism, the combination, substantially as specified, of a progressing permuter provided with projecting studs, and a controller, which is moved across the face of the permuter by successive steps, and adapted to be supported after each step by one of the studs of the permuter.

9. In a permutation mechanism, the combination, substantially as before set forth, of a permuter, a controller, and a driver, which, when revolved in one direction, moves the controller, and when revolved in the opposite direction moves the permuter.

10. A driver provided with a reversible transmitter, substantially as before set forth, whereby the power of the driver may be transmitted from one side thereof when turning in a certain direction, and from the other side thereof when turning in the opposite direction.

11. In a permutation mechanism, the combination, substantially as before set forth, of a permuter, a controller, and a driver provided with a reversible transmitter, which, when the driver is turned in one direction, moves the controller, but moves the permuter when the driver is turned in the opposite direction.

12. The combination, substantially as before set forth, of a bolt or bolt-work guarding permutation mechanism containing a permuter, which requires to be advanced stepwise in working out the combination, and a time mechanism, which renders the said permuter operative at certain times and inoperative at other times as regards the working out of the combination.

13. The combination, substantially as before set forth, of the permuter of the permutation mechanism, a time mechanism, which renders the permuter operative at certain times and inoperative at other times as regards the working out of the combination, and the controller, which is moved stepwise across the face of the permuter, and is adapted to be supported thereby after each step.

14. In a permutation mechanism, the combination, substantially as before set forth, of a permuter and a controller, which are moved alternately, and a trip device for supporting the controller while the permuter is in motion.

15. The combination, substantially as before set forth, of the dial provided on its periphery with notches corresponding with the time-divisions thereof, and a pin (for stopping the progress of the hand) carried on a spring adapted to slide around the dial, and provided with a tooth to engage any one of the notches of said dial.

16. The combination, substantially as before set forth, of the hand, a fixed toothed wheel, and a movable segment for rigidly securing the hand to the fixed toothed wheel at any point on the circumference of the same.

17. The combination, substantially as before set forth, of the mainspring and a mechanism actuated by the mainspring, in case the latter breaks or runs down, to lock the time mechanism of a lock, and thereby provide for unlocking.

18. The combination, substantially as before set forth, of the bolt-work and a dogging device, which is placed in position by the bolt-work when shot for dogging the same, and also removed thereby when retracted.

19. The combination, substantially as before set forth, of the permuter, a hook adapted to be arranged successively in the path of the different permutable studs of the permuter along the path of the controller-support stud, and a means outside of the lock-case for setting said hook, whereby the combination of the permutation mechanism may be ascertained.

20. The combination, substantially as before set forth, of one of the wheels of the time-piece, a pawl, the thrust or pressure of which is received by said wheel, and a mechanism for approximately balancing the thrust of said pawl.

21. The combination, substantially as before set forth, of a dogging device for the bolt-work or non-time lock of a safe or other secure receptacle and a dual time-lock containing a controller which governs the said dogging device.

22. The combination, substantially as before set forth, of the stepwise-moving controller of the permutation mechanism and a means for stopping the controller from moving back beyond any one particular step, whereby the permutation mechanism may be arranged so that only one or a portion of all the steps of the permutation requires to be worked out in unlocking.

23. The combination, substantially as before set forth, of the handle-arbor provided with a dial, the index-wheel, and the wheel on the handle-arbor for driving said index-wheel.

In testimony that I claim the foregoing as my own I affix my signature in presence of two witnesses.

M. A. DALTON.

Witnesses:
CHAS. A. NEALE,
S. WOLF.